(12) United States Patent
Sugiura

(10) Patent No.: US 7,372,529 B2
(45) Date of Patent: May 13, 2008

(54) LIQUID CRYSTAL DISPLAY DEVICE

(75) Inventor: Norio Sugiura, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 36 days.

(21) Appl. No.: 10/802,271

(22) Filed: Mar. 17, 2004

(65) Prior Publication Data
US 2004/0189925 A1 Sep. 30, 2004

(30) Foreign Application Priority Data
Mar. 28, 2003 (JP) ............... 2003-091612

(51) Int. Cl.
G02F 1/1368 (2006.01)
G02F 1/1335 (2006.01)
G02F 1/1343 (2006.01)

(52) U.S. Cl. .......... 349/113; 349/39; 349/42; 349/114; 349/143; 349/145

(58) Field of Classification Search .......... 349/38, 349/43, 113, 114, 144, 146, 130, 39, 42, 129, 349/143, 178
See application file for complete search history.

(56) References Cited

U.S. PATENT DOCUMENTS

| | | | |
|---|---|---|---|
| 4,701,028 A | 10/1987 | Clerc et al. | |
| 5,684,552 A | 11/1997 | Miyamoto et al. | 349/106 |
| 5,753,937 A | 5/1998 | Shimomaki et al. | |
| 6,369,870 B1 | 4/2002 | Koma | 349/130 |
| 6,373,539 B1 | 4/2002 | Tsuda | |
| 6,452,655 B1 | 9/2002 | Nishiyama et al. | 349/130 |
| 6,897,924 B2 | 5/2005 | Tashiro et al. | 349/113 |
| 6,943,856 B2 | 9/2005 | Yamaguchi et al. | 349/67 |
| 6,954,244 B2* | 10/2005 | Jeon et al. | 349/113 |
| 2002/0057408 A1 | 5/2002 | Nishiyama et al. | 349/123 |
| 2002/0075432 A1 | 6/2002 | Yamaguchi et al. | 349/113 |
| 2002/0118326 A1* | 8/2002 | Sakamoto et al. | 349/113 |
| 2002/0140886 A1 | 10/2002 | Sigiura et al. | |
| 2004/0001174 A1* | 1/2004 | Doi et al. | 349/113 |
| 2004/0145689 A1* | 7/2004 | Sugiura et al. | 349/113 |

FOREIGN PATENT DOCUMENTS

| | | |
|---|---|---|
| JP | A 7-333598 | 12/1995 |
| JP | 2000-105379 | 4/2000 |
| JP | A 2000-267081 | 9/2000 |
| JP | 3187369 | 5/2001 |
| JP | 2002-207214 | 7/2002 |
| JP | A 2002-221716 | 8/2002 |
| JP | A 2002-296585 | 10/2002 |
| JP | 2002-350830 | 12/2002 |

* cited by examiner

Primary Examiner—Toan Ton
Assistant Examiner—Tai Duong
(74) Attorney, Agent, or Firm—Greer, Burns & Crain, Ltd.

(57) ABSTRACT

A liquid crystal display device has been disclosed. The liquid crystal display device provides a display with a high reflectance (high transmittance) and a high color purity while maintaining white balance and adjusts the white balance by changing the occupied area instead of the transmission characteristics of a CF in order to prevent yellowing of the display due to a low-temperature light source.

13 Claims, 26 Drawing Sheets

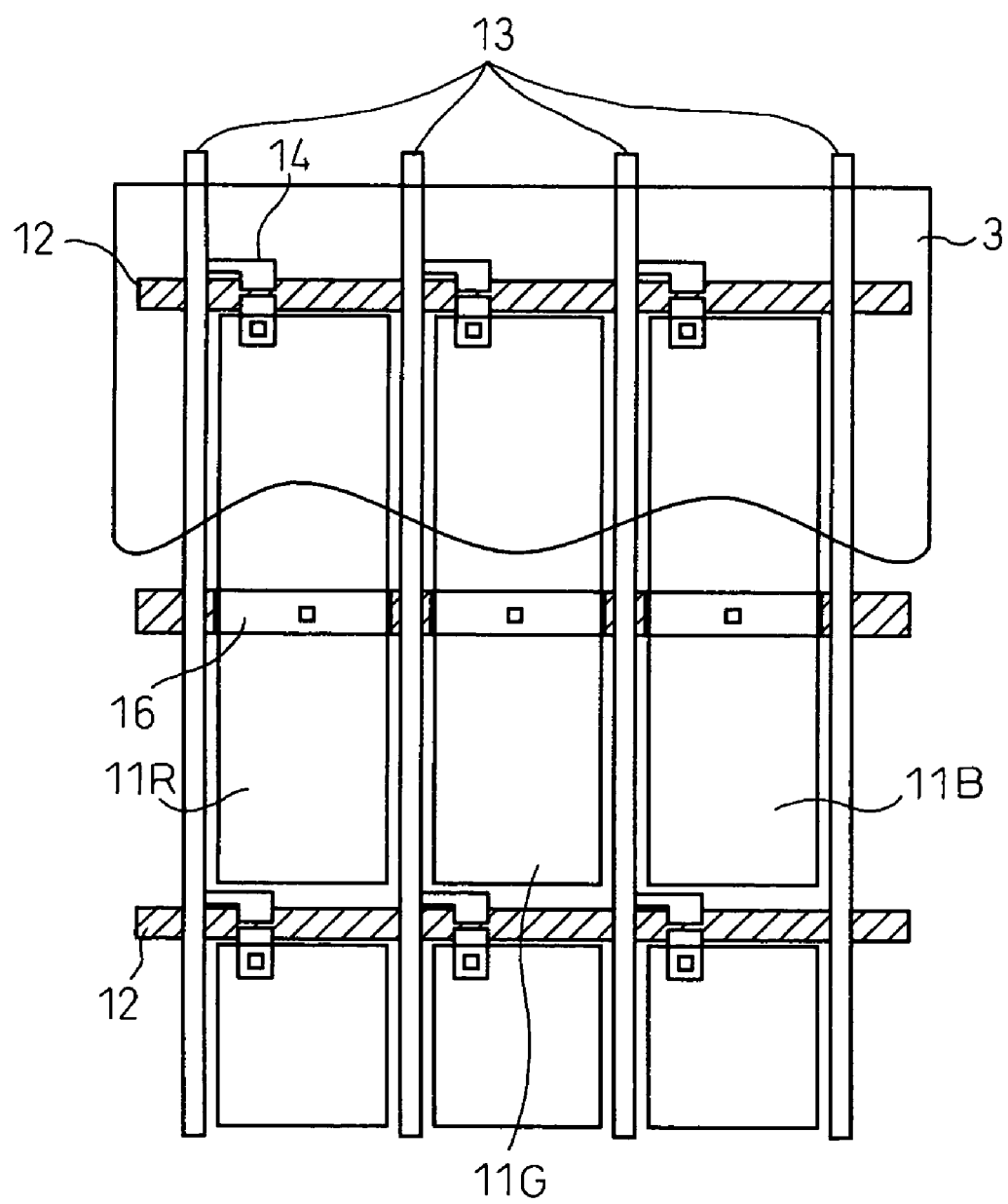

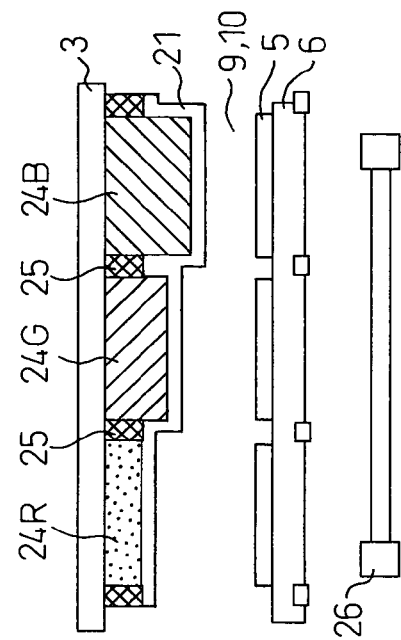
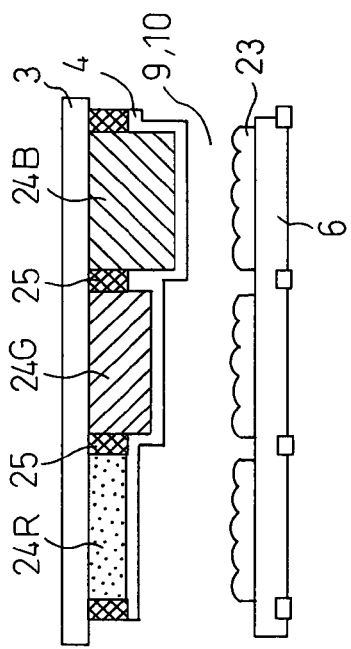
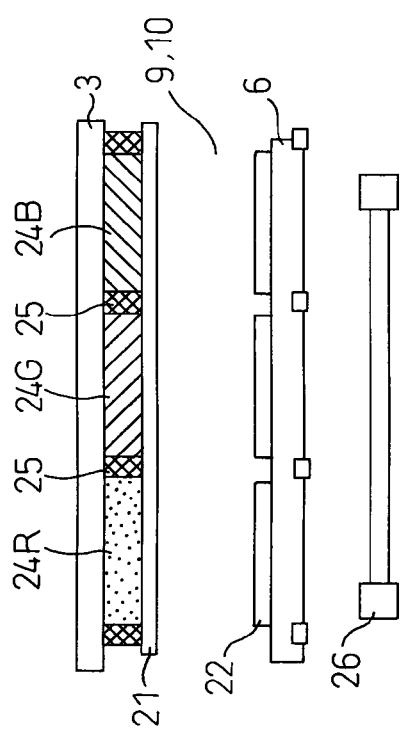
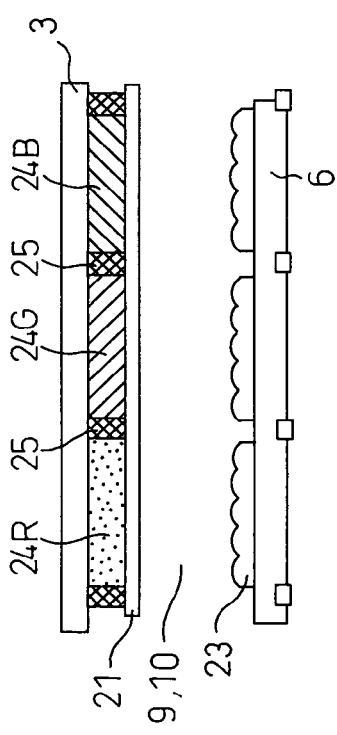

◇R □G △B

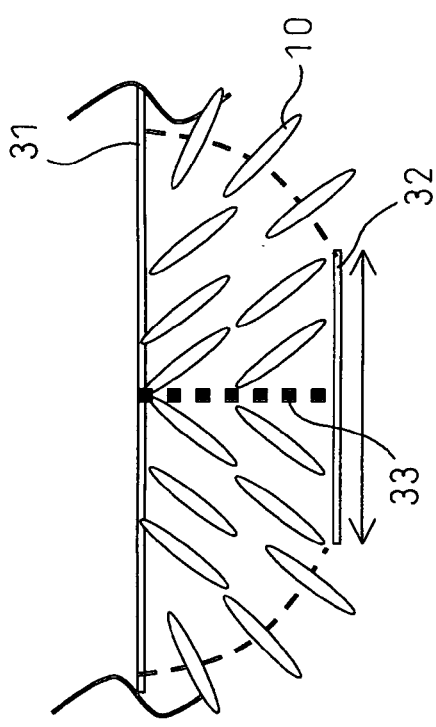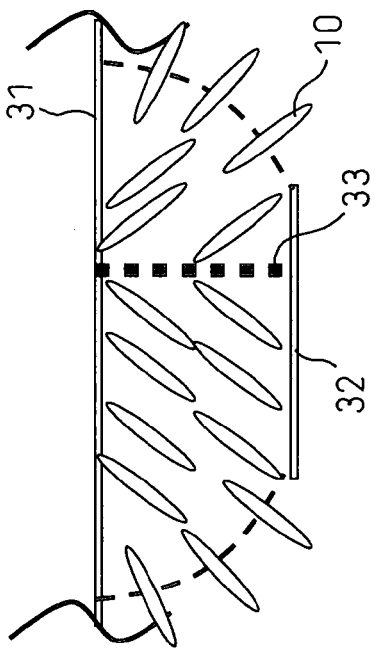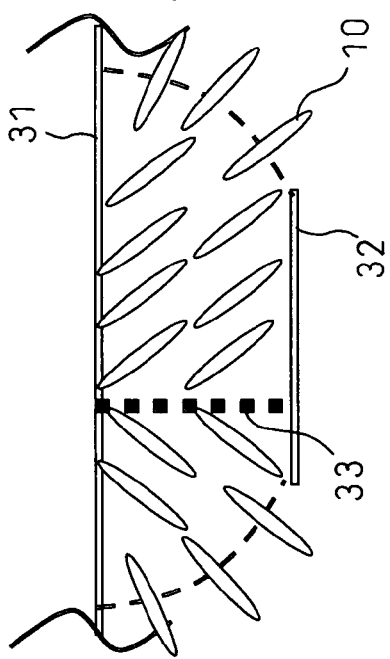

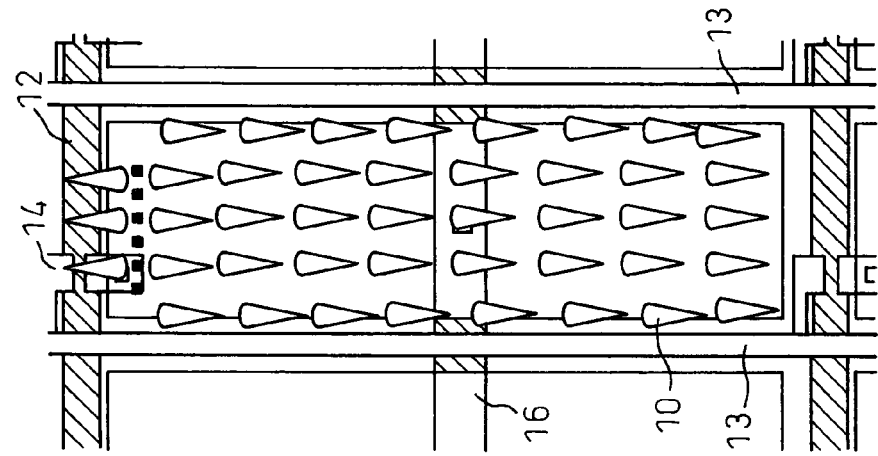
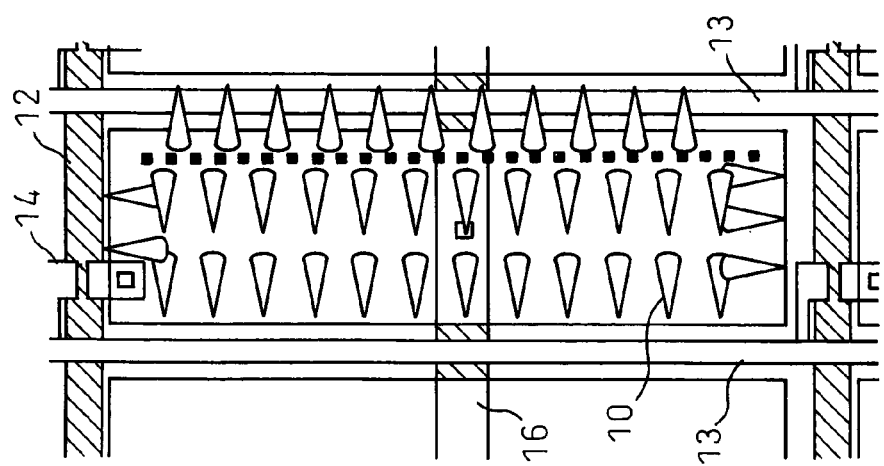

LIQUID CRYSTAL DISPLAY DEVICE

BACKGROUND OF THE INVENTION

The present invention relates to a liquid crystal display device. More particularly, the present invention relates to a liquid crystal device of a reflection type and to a liquid crystal device of a reflection-transmission capacitance type.

In recent years, a liquid crystal display device of a reflection type capable of realizing a light, thin and low-power consumption type, among liquid crystal display devices using an active matrix, has attracted interest. The liquid crystal display device of a reflection type is characterized by its thinness, lightness and low-power consumption and is capable of realizing a display like paper because the display is attained by utilizing surrounding light. At the present time, a single polarizing plate system is put to practical use as a liquid crystal display of a reflection type. The liquid crystal display device of a reflection type using this system can have a high contrast and attain a relatively bright display because only one polarizing plate is used.

FIG. 1 is a diagram showing the panel structure of the above-mentioned liquid crystal display (LCD) device of a reflection type using the single polarizing plate system. In this panel structure, as shown in FIG. 1, liquid crystal of a TN type 9 is sandwiched between a transparent substrate 3, on one surface on which a phase difference plate 2 and a polarizing plate 1 are formed and on the other surface on which a transparent electrode 4 is formed, and a substrate 6 on the surface on which a diffuse reflective electrode 5 is formed. The liquid crystal of a TN type 9 is parallelly aligned at the boundary surface between the electrodes 4 and 5 and twisted in the direction of thickness. In this case, a dark state is displayed in a state in which a voltage is applied but, at this time, the molecules at the boundary surface are not deformed because of the anchoring effect, therefore, retardation occurs at this part and it is difficult to attain a very high contrast.

U.S. Pat. No. 4,701,028 has disclosed a liquid crystal display device using liquid crystal of a VA type 10, in which a ¼ wavelength plate 7 is used instead of the phase difference plate 2 and the boundary surface is vertically aligned as shown in FIG. 2. This can realize a dark state during the period with no voltage applied (in a state in which no alignment deformation exists). In this case, as no residual retardation exists in a black state, a very high contrast can be attained.

On the other hand, the optimization of the reflective electrode becomes very important in order to realize a bright display. For example, a technique for producing unevenness both randomly and very densely on the surface of the reflective electrode has been proposed. The object of this technique is to prevent the reflected light from being colored by preventing interference of light due to the repetitive pattern of the unevenness by increasing the extent of the randomness of the unevenness, and to reduce the components of regularly reflected light by decreasing the flat area by increasing the density of the unevenness. Further, a technique for attaining a bright display has been proposed, in which the average tilting angle of the unevenness is limited in order to condense the scattered light into an area within a certain range. Furthermore, Japanese Patent No. 3187369 has proposed a reflective electrode in which the probability of the existence of tilting angles within a specific range increases as the tilting angle increases, thereby a liquid crystal display element of a reflection type capable of obtaining a uniform brightness within the effective viewing angles has been realized.

The above-mentioned unevenness on the surface of the electrode was formed by the use of a photo lithography, but the process was complicated and there was a problem: the margin of manufacturing process was narrow because the reflection characteristics changed considerably when the shape was changed due to the exposure conditions.

The present applicants have developed a technique for forming a diffuse reflective electrode having wrinkle-like unevenness (microscopic grooves) without using a photo lithography in order to reduce the cost and have proposed a liquid crystal display device of a reflection type having a high reflectance and a high contrast ratio by adopting liquid crystal of a VA type in Japanese Unexamined Patent Publication (Kokai) No. 2002-221716.

Moreover, the present applicants have disclosed a technique in Japanese Unexamined Patent Publication (Kokai) No. 2002-296585 for controlling the orientation of the wrinkle-like unevenness by providing a structure 8 for generating a difference in level under the diffuse reflective electrode (wrinkle-like unevenness layer) 5 having the wrinkle-like unevenness as shown in FIG. 3. The surface of the wrinkle-like unevenness layer corresponds to the surface of the differences in level of the structures located thereunder. Various shapes of the structure are possible and an example is a linear structure parallel to the short side of a rectangular pixel electrode as shown in FIG. 4. As shown in FIG. 4, the domain defined by neighboring gate electrode lines 12 and neighboring source electrode lines 13 is the pixel-domain and a pixel electrode 11 is provided therein. At the crossing of the gate electrode line 12 and the source electrode line 13, a TFT 14 is provided and the gate of the TFT 14 is connected to the gate electrode line 12, the source to the source electrode line 13, and the drain to the pixel electrode 11 via a contact hole 15. An auxiliary capacitor 16 is provided under the pixel electrode 11 and the pixel electrode 11 is connected to one of the electrodes of the auxiliary capacitor 16 via the contact hole 15.

On the other hand, the visibility is affected considerably by the light source environment in the case of the liquid crystal display device of a reflection type. Therefore in a dark environment, there arises a problem: the visibility is very poor. In the case of a liquid crystal display device of a transmission type, as a backlight is used, the power consumption is high but the contrast is high and the visibility is high in a dark environment. However, in a bright light source environment, the visibility is degraded considerably and the display quality becomes inferior to that of a reflection type.

As a system to solve the above-mentioned problem, a system of the combination of this liquid crystal of a reflection type and a front light (FL) or a reflective panel combining a semi-transmitting reflective film has been disclosed in Japanese Unexamined Patent Publication (Kokai) No. 7-333598.

However, in the case of the front light system, as colors are adjusted when the front light is lit, the whiteness degree (white balance) is degraded because of yellowing, and so on, in the case of a reflective display. This is because the color temperature of a fluorescent light is 4,200K to 5,500K and the color temperature of a light source in a normal light source environment is equal to or lower than 6,000K, which is the color temperature of the sunlight or, in other words, because the color temperature in a light source environment is low.

As to the semi-transmission system, a system in which the color purity is made to differ between the reflection domain and the transmission domain has been disclosed in Japanese Unexamined Patent Publication (Kokai) No. 2000-267081 but, in this technique, the difference lies only in that a front light is replaced by a back light (BL) and colors are adjusted when the back light is lit, therefore the whiteness degree (white balance) is degraded because of yellowing, and so on, in the case of a reflection display.

In the above-mentioned systems, the reasons why the adjustment of the colors of the reflected light is difficult are that the color temperature of a light source is low and that the adjustment of the transmission spectra of the color filter (CF) in accordance with a low temperature light source is difficult.

FIG. 5 is a diagram of the pixel configuration of a TFT liquid crystal panel using three general RGB primary color filters (CF). As shown in FIG. 5, three sub-pixels, that is, an R pixel, a G pixel and a B pixel make up one display pixel. In the prior art, the CF pattern is formed so as to cover the entire display domain of sub-pixels (pixel electrode domain) and there are two cases, that is, one case where a gap exists between each CF as shown in FIG. 5 and the other case where a black matrix (BM) is formed in the gap.

FIG. 6A to FIG. 6D are diagrams for explaining the method for adjusting the chromaticity, and FIG. 6A and FIG. 6B show the case of a transmission type and FIG. 6C and FIG. 6D show the case of a reflection type, and in both cases the black matrix (BM) is provided. AS shown in FIG. 6A and FIG. 6B, in the panel of a reflection type, three color filers (CF) 24R, 24G and 24B are provided on the CF substrate 3, a BM 25 is provided therebetween, and a transparent opposed electrode 21 is provided thereon. The opposed electrode 21 corresponds to the transparent electrode 4 in FIG. 1. A pixel electrode 22 is provided on the TFT substrate 6. The liquid crystal layers 9 and 10 are provided between the substrates and a back light (BL) source 26 is provided behind the TFT substrate 6. In the case of a transmission type, the chromaticity is adjusted by controlling the transmission characteristics of each color filter (CF) 24R, 24G and 24B. In the case of a general pigment-scattered CF (photo sensitive resin on which pigment is scattered is formed into patterns by a photo lithography), the thickness of the CF is the same as shown in FIG. 6A and the chromaticity characteristics are adjusted by controlling the amount of pigment to be scattered, or the amount of pigment to be scattered is the same as shown in FIG. 6B and the chromaticity characteristics are controlled by changing the thickness of film. Moreover, in addition to the chromaticity of the CF, it is possible to control the color balance by controlling the chromaticity of a BL light source.

As shown in FIG. 6C and FIG. 6D, in the panel of a reflection type, the three color filters (CF) 24R, 24G and 24B are provided on the CF substrate 3, the BM 25 is provided therebetween, and the transparent opposed electrode 21 is provided thereon. The TFT substrate 6 is provided with a reflective pixel electrode 23 corresponding to the reflective electrode 5 shown in FIG. 1. The liquid crystal layers 9 and 10 are provided between the substrates. In the panel of a reflection type also, the chromaticity is adjusted by controlling the transmission characteristics of each of the color filters (CF) 24R, 24G and 24B and the thickness of the CF is the same and the chromaticity characteristics are adjusted by controlling the amount of pigment to be scattered as shown in FIG. 6C, or the amount of pigment to be scattered is the same and the chromaticity characteristics are controlled by changing the film thickness as shown in FIG. 6D.

Moreover, in the case of a reflection type, the color balance changes depending on the color temperature (chromaticity) of the external light.

Particularly in the case of a transmission type, it is usual that a light source whose color temperature is near to that of the D65 standard light source is used, but in a normal light source environment, light of a lower temperature than the D65 standard light source is predominant. Because of this, the color purity is degraded in the case of a reflection type. FIG. 7A and FIG. 7B show the color reproduction area plotted with R, G and B in the case of the D65 light source when the film thickness of the pigment-scattered type CF material is changed (the case where the amount of pigment to be scattered is changed is the same), and FIG. 7A shows the case of a transmission type and FIG. 7B shows the case of a reflection type. From FIG. 7A and FIG. 7B, it is found that the tendency toward saturation of the color purity in the G domain in the case of a reflection type is stronger than in the case of a transmission type. In the case of a reflection type, if the designed light source is the D65 environmental light source, there will not arise any problem but, in an actual environment, a light source equal to or lower than D55 is used in most cases and, therefore, the color reproduction area shifts in the direction toward lower temperatures (x and y increase and yellowing occurs). The above-mentioned tendency toward saturation is stronger in the case of a reflection type than in the case of a transmission type because the y value is prevented from being increased in order to avoid the above-mentioned phenomenon. In addition, this is because the transmission characteristics are prioritized in the case of a reflection type. Therefore, it was difficult to prevent the expansion of the color reproduction area (the NTSC ratio of the area of the RGB triangle) and the yellowing of the whiteness degree of a lower temperature light source in the case of a conventional reflection type.

FIG. 8 shows the change in the whiteness degree when the film thickness is changed in the panel of a reflection type. It was found that the whiteness degree is considerably influenced by yellowing (both x and y increase) when the light source changes from D65 to D55 in the standard reflective CF (film thickness is 0.75 μm) configuration. To prevent this, the color purity of the B sub-pixel is generally increased. However, only the y value is decreased and x shows a tendency to increase. Contrary to this, when the film thickness of RG is reduced, both x and y are found to show a tendency to decrease (shift toward high temperatures). However, it is found that when the film thickness of RG is reduced, the color reproduction area is reduced as shown in FIG. 9.

Moreover, the panel of a refection type excellent in display quality has been realized, but the display of a reflection type has been increasing its outdoor uses because of the recent mobile boom and the like. There arises a problem of the property of withstanding vibrations. Generally, the surface of a display or the like is unlikely to be pressed with strong force or used under constantly vibrational conditions, but it is necessary to prepare for a severely vibrational environment in which the display is used for mobile purposes or outdoor circumstances.

In the liquid crystal display device of a VA reflection type having the wrinkle-like unevenness and which has realized a high reflectance and a high contrast ratio, an afterimage appears and the display quality is degraded when the display of a moving cursor is attempted in a vibrating environment.

FIG. 10A to FIG. 10C are diagrams showing the alignment states of liquid crystal (sectional views) in the TFT driven liquid crystal display device of a VA type using n-type liquid crystal whose dielectric constant anisotropy is negative, wherein the occurrence and the change in the position of the disinclination line are shown. As shown in FIG. 10A, when the alignment control (control of the tilting orientation of liquid crystal) is not carried out, the tilting orientations of the liquid crystal molecules 10 between an opposed electrode 31 and a pixel electrode 32 are controlled by the oblique electric field generated at the edge of the pixel electrode 32 and a disinclination line (poor display part) 33 occurs at the domain where tilting orientations of the liquid crystal molecules meet. The disinclination line becomes unstable because of the external disturbance such as the unevenness on the electrode surface or the transverse electric field of drive wires (data bus, gate line) on the periphery of the pixel and the position of the disinclination line 33 changes, as shown in FIG. 10B and FIG. 10C, resulting in the degradation in display quality.

An example of a method for solving this problem is one in which a dielectric 34 is formed on the electrode (the opposed electrode 31, in this case) as shown in FIG. 11A, or a slit 35 is provided in the electrode (the opposed electrode 31, in this case) as shown in FIG. 11B so that the stability can be attained by controlling the electric field in the gap. As shown schematically, the disinclination line 33 is formed stably at the part of the protrusion 34 or the slit 35. However, when this method is used, as the disinclination line is formed in the effective display area, there arises a problem: the reflection or transmission characteristics are degraded.

In order to solve this problem, a method is possible in which a disinclination control structure (protrusion 34 or slit 35) is formed at the edge of the pixel electrode 32 as shown in FIG. 12A and FIG. 12B. By the use of this method, in a domain 36, the force for alignment control by the protrusion 34 and the edge of the pixel electrode 32 is strong and the disinclination line 33 is formed stably. In a domain 37, the force for alignment control by the edge of the pixel electrode 32 is strong. Owing to the forces for alignment control in the domains 36 and 37, normally the disinclination line 33 is formed stably as shown in FIG. 12A and FIG. 12B and no disinclination line is formed in other parts. Therefore, it is found that the degradation in the reflectance and the transmittance due to the disinclination can be prevented.

However, when vibrations are applied to the panel surface in the above-mentioned structure, it is found that the alignment was disturbed, many disinclination lines 38 occurred and the display quality is degraded in the domain between the domains 36 and 37, where the force for alignment control is weak, as shown in FIG. 12C.

SUMMARY OF THE INVENTION

As described above, in the prior art using the reflective CF, it was difficult to prevent the expansion of the color reproduction area (the NTSC ratio of RGB triangle area) and the yellowing of the whiteness degree due to a low temperature light source.

The first object of the present invention is to realize a liquid crystal display device having a high reflectance (high transmittance) and high color purity while maintaining white balance.

By the way, preferable specific patterns of the wrinkle-like unevenness on the reflective electrode have not been disclosed in Japanese Unexamined Patent Publication (Kokai) No. 2002-296585.

The second object of the present invention is to realize preferable specific patterns of the wrinkle-like unevenness on the reflective electrode in order to solve the above-mentioned problem and to realize a low-cost liquid crystal display device of a reflection type excellent in reflectance and contrast ratio.

The third object of the present invention is to realize a liquid crystal display panel capable of realizing a display as a high reflectance and a high contrast ratio and having an excellent property of withdrawing vibrations without causing poor display such as an afterimage even in a vibrating environment.

A first aspect of the present invention is such one to attain the first object, in which the white balance is adjusted by changing the occupied area, instead of the transmission characteristics of CF, in order to prevent the yellowing of the display due to a low-temperature light source.

FIG. 13 is a diagram showing the change in chromaticity when the RGB color purity is fixed (fixed film thickness) and the area proportion of the sub-pixels RGB is changed. From FIG. 13, it is seen that the whiteness degree can be shifted toward the side of higher temperatures (x and y decrease) by reducing the area of the sub-pixel R and the area of the sub-pixels R and G without degrading the color purity. The reflectance characteristics under these conditions are shown in FIG. 14. From FIG. 14 it is found that there is almost no degradation in reflectance.

According to the first aspect of the present invention, the same effect can be obtained for a transmission type and a semi-transmission type, not limited to a reflection type, only if the CF layer is included, and as for the mode of the liquid crystal layer, the effect can be obtained for any mode such as a TN type, VA type, HAN type or IPS.

According to the first aspect of the present invention, it is possible to realize a liquid crystal display device having a high reflectance (high transmittance) and a high white purity while maintaining a proper whiteness degree (white balance), which was difficult in the prior art.

In other words, the liquid crystal display device according to the first aspect of the present invention is characterized in that one pixel is composed of multiple sub-pixels which can be controlled independently of each other and the area of the display effective domain of at least one of the multiple sub-pixels is different from the that of the display effective domain of other sub-pixels.

The display effective domain is defined by, for example, the domain of a wavelength selection layer (RGB color filter) or at least one of the transmission domain and the reflection domain of a pixel electrode.

The wavelength selection layer is realized by a color filter formed by transparent resin with pigment or dye.

In addition to the area of the display effective domain, it is also possible to make the film thickness of the wavelength selection layer of at least one sub-pixel differ from the film thickness of the wavelength selection layer of other sub-pixels.

One pixel is composed of at least three or more sub-pixels of RGB or YMC.

In order to increase the reflectance, it is desirable to provide a reflection domain in which unevenness is formed at part of the surface of the pixel electrode.

It is desirable that the setting of color adjustment of the liquid crystal display device is carried out on the assumption that the color temperature of a light source is equal to or lower than the D65 color temperature.

A second aspect of the present invention is to attain the second object and a liquid crystal display device using a reflecting plate having wrinkle-like unevenness on the surface thereof is characterized in that at least part of the wrinkle-like unevenness comprises a first linear part extending in a first direction, a second linear part extending from the top end of the first linear part in a second direction which differs from the first direction by certain angles to a predetermined side, and a third linear part extending from the top end of the second linear part in a direction which differs from the second direction by certain angles to the predetermined side. In other words, both sides of each wrinkle are bent toward the same side with respect to the central part.

According to the second aspect of the present invention, in the case of the reflective electrode having wrinkle-like unevenness, it is possible to realize a low-cost liquid crystal display device of a reflection type excellent in reflectance and contrast ratio.

It is desirable that the direction in which the wrinkle-like unevenness mainly extends is a vertical or transverse direction on the display surface of the liquid crystal display device, the distance between neighboring crests or troughs of the wrinkle-like unevenness is equal to or less than 15 µm, and the distance between neighboring crests or troughs of the wrinkle-like unevenness differs randomly from each other or for each RGB pixel.

Both sides are bent, for example, through 45° or less with respect to the central part.

It is desirable that the average tilting angle of the wrinkle-like unevenness is, for example, between 5° and 15°.

As disclosed in Japanese Unexamined Patent Publication (Kokai) No. 2002-296585, the wrinkle-like unevenness can be realized by providing a structure having unevenness under the reflecting plate and forming wrinkle-like unevenness along the unevenness of the structure. No additional manufacturing process is required if the structure is formed in the same layer of at least one of the signal wire, gate wire and storage capacitor of a TFT substrate, or at least part of the structure is formed in the same layer of at least one of the signal wire and gate wire of a TFT substrate. If the width of the structure is, for example, equal to or less than 10 µm and the distance is equal to or less than 15 µm, the formation of the wrinkle-like unevenness can be controlled properly.

It is possible for at least one of the signal wire, gate wire and storage capacitor to bend in a similar fashion as the structure, and for the sides of the pixel electrode to bend as the structure.

It is possible to provide a light transmission domain on the reflecting plate so that a display of a transmission type and of a reflection type can be attained.

If the liquid crystal display device according to the second aspect of the present invention is of a vertically aligned type using n-type liquid crystal for the liquid crystal layer, a high contrast can be realized.

A third aspect of the present invention is to attain the third object and the alignment of at least one of the electrodes is processed in the vertically aligned liquid crystal display device so that the liquid crystal molecules are tilted almost in the same direction when an electric field is applied and the domain in which the tilting orientation of the liquid crystal molecules due to the oblique electric field on the periphery of the pixel and the alignment orientation of the liquid crystal molecules within the pixel intersect at an angle larger than 90° is minimized.

To improve the property of withstanding vibrations, it is necessary to increase the force for alignment control over the entire aligned film surface. Therefore, the force for alignment control was increased over the entire surface within the display area by carrying out any one of the rubbing process, UV alignment process, ion beam alignment process and UV curable resin alignment process, or a combination thereof on the aligned film surface. Actually, the rubbing process was carried out along the short side of the pixel only on the opposed substrate (transparent electrode side) in the reflective panel of a vertically aligned type having rectangular pixels so that the liquid crystal was made to tilt in this direction. When the occurrence of the disinclination was inspected in this case, a more excellent property of withstanding vibrations compared with the conventional one was observed.

However, the property of withstanding vibration was not at a sufficiently acceptable level. Therefore, the rubbing process was carried out along the long side of the pixel and the property of withstanding vibration was further improved as a result.

Because of this, it is desirable that the alignment process is carried out in such a way that the liquid crystal molecules are tilted in the longitudinal direction of the pixel electrode while a voltage is being applied in the case where the pixel electrode is strip-shaped, and the alignment process is carried out in such a way that the liquid crystal molecules are tilted in the direction in which the long side of the pixel electrode extends while a voltage is being applied in the case where the pixel electrode is rectangular.

It is also possible to operate the liquid crystal display device as a reflection type or a semi-transmission type by providing a reflection domain having a surface, of which the difference in level of the unevenness is equal to or less than 1.5 µm, at least at part of the pixel.

It was discovered that if there was part where the cell thickness was greater than the surrounding area, or to be more specific, if there was a dip such as a contact hole in the pixel electrode, the disinclination was trapped therein and became stable. Therefore, in order for the disinclination to occur in a less influential manner, it is desirable that a dip is provided in the end portion in the longitudinal direction of the pixel electrode so that the thickness of the liquid crystal layer is increased. A dip can be realized by the use of a contact hole.

As for the alignment process, at least one of the rubbing alignment process, ion beam alignment process, aligned film UV alignment process and UV curable resin alignment process is used.

When the liquid crystal display device is a liquid crystal display device of an active matrix type using a TFT, the effect of the present invention can be obtained by carrying out the alignment control only on the opposed electrode (common electrode) side.

In the third aspect, the liquid crystal can be n-type nematic liquid crystal whose dielectric constant anisotropy is negative or p-type nematic liquid crystal whose dielectric constant anisotropy is positive.

According to the third aspect, it is possible to realize a liquid crystal display panel capable of realizing a high reflectance and a high contrast ratio and at the same time having the excellent property of withstanding vibrations without causing display errors such as an afterimage even when used in a vibrational environment.

BRIEF DESCRIPTION OF THE DRAWINGS

The features and advantages of the invention will be more clearly understood from the following description taken in conjunction with the accompanying drawings, wherein:

FIG. 5 is a diagram showing the pixel configuration of a liquid crystal display (LCD) device.

FIG. 6A to FIG. 6D are diagrams for explaining conventional examples of color adjustment.

FIG. 10A to FIG. 10C are diagrams showing the occurrence of a disinclination line and the change in position thereof.

FIG. 25A and FIG. 25B are diagrams showing the influence of the alignment direction in the liquid crystal display device in the third embodiment.

DESCRIPTION OF THE PREFERRED EMBODIMENTS

FIG. 15A to FIG. 15D are diagrams showing the panel structure of the liquid crystal display device of a reflection type in the first embodiment of the present invention. In the structure shown in FIG. 15A, the areas of the three CF's are set in such a way that the area of a CF24R of R is the smallest, the area of a CF24G of G is larger than that of the CF24R and the area of a CF24B of B is the largest, and the width of the three CF's is the same and no black matrix (BM) is formed. The area of the reflective pixel electrode 23 is the same for each of the three colors and the display effective area of each color is made to differ by changing the area of each CF. Either way, as the area of each CF differs from another, a desired setting of the chromaticity is possible and a desired chromaticity can be obtained by adjusting the amount of pigment to be scattered for each CF.

Figure 15A:
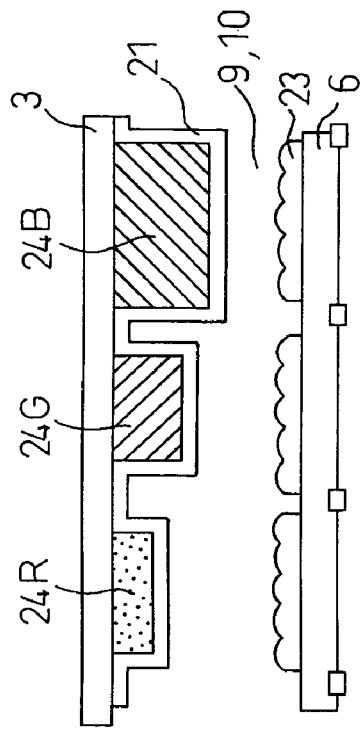
FIG. 15A to FIG. 15D are diagrams showing the panel structure of a liquid crystal display device in a first embodiment of the present invention.

The structure shown in FIG. 15A is manufactured by the use of the technique disclosed in Japanese Unexamined Patent Publication (Kokai) No. 2002-221716 or Japanese Unexamined Patent Publication (Kokai) No. 2002-296585, in which the reflective electrodes having the same area, on the surfaces of which unevenness is formed and which is sputtered with aluminum (Al), are formed on the surface of the pixel domain on the TFT substrate. On the opposed (CF) substrate 3, the CF's 24R, 24G and 24B, of which the amount of pigment to be scattered is made to differ from each another, are partly formed, the transparent opposed electrode (ITO) 21 is formed thereon, vertically aligned films are formed on the CF substrate 3, and the rubbing process is carried out only for the CF substrate 3. After this, the TFT substrate 6 and the CF substrate 3 are bonded together via a 3 μm spacer for forming a null cell and a panel is manufactured by injecting n-type nematic liquid crystal. The method for manufacturing other parts is the same as before. Due to this, a TFT driven liquid crystal display device of a reflection type having a high reflectance can be realized.

Figure 15B:
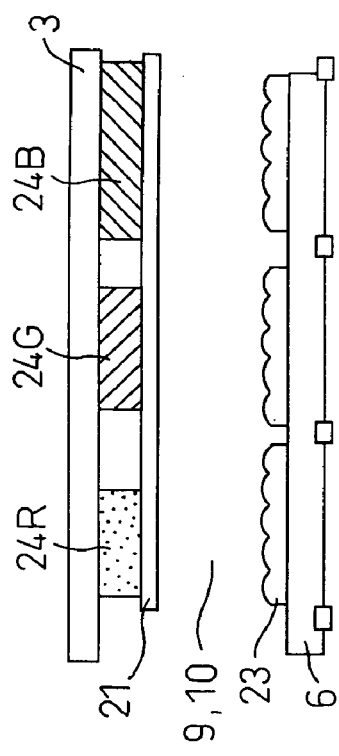

FIG. 15B is a diagram showing a modification example of the panel structure in the first embodiment. In this modification example, the areas of the three CF's 24R, 24G and 24B are made to differ from each another. Then a desired chromaticity can be obtained by adjusting the thickness of the three CF's 24R, 24G and 24B while maintaining the amount of pigment to be scattered of each CF to be the same.

Figure 15C:
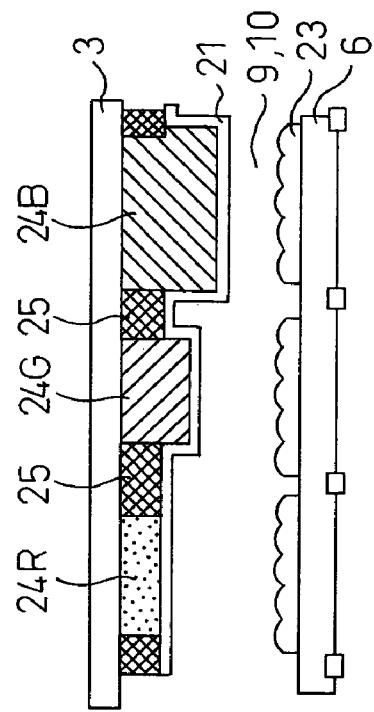
Figure 15D:
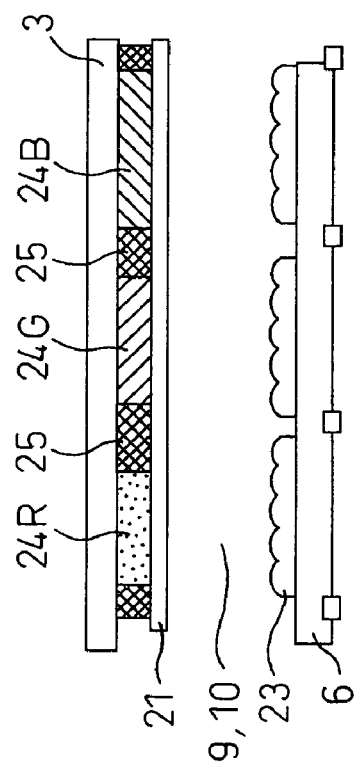

FIG. 15C and FIG. 15D are diagrams showing modification examples of the panel structure in the first embodiment, which differ from the panel structures in FIG. 15A and FIG. 15B in that the black matrix (BM) 25 is provided between each CF, respectively. Due to this, a TFT driven liquid crystal display device of a reflection type having a high color purity, a high contrast and a high reflectance can be realized.

When the panel having this structure is applied to a liquid crystal display device of a reflection type with a front light (FL), the color temperature of the FL light source is set to a lower temperature (for example, D55) so that a desired color can be obtained. Due to this, a liquid crystal display device of a reflection type with a front light excellent in display quality can be realized, of which the change in color in an FL-lit state and in a state of only reflection is slight.

FIG. 16A to FIG. 16D are diagrams showing modification examples of the panel structure in the first embodiment. The panel structures in FIG. 16A and FIG. 16B differ from the panel structures in FIG. 15C and FIG. 15D in that the shape of the reflective electrode 23 of each color is made to differ in accordance with the shape of each CF. The same effect can also be obtained from these structures.

Figure 16A:
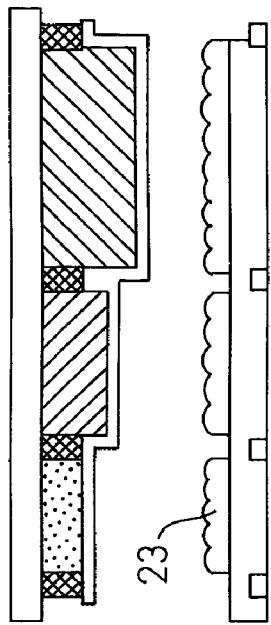
FIG. 16A to FIG. 16D are diagrams showing modification examples of the panel structure of the liquid crystal display device in the first embodiment.
Figure 16B:
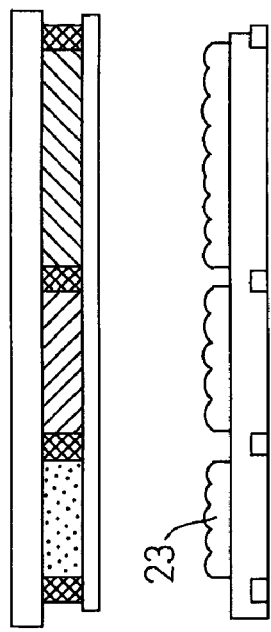
Figure 16C:
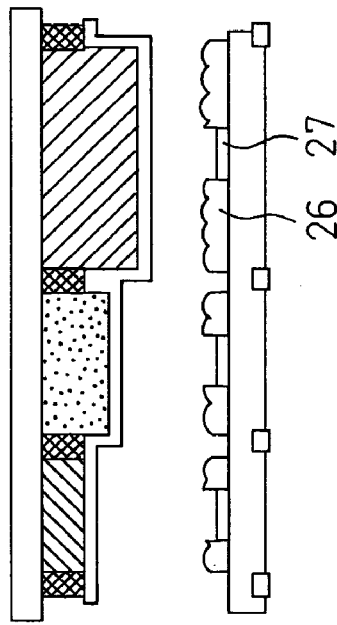
Figure 16D:
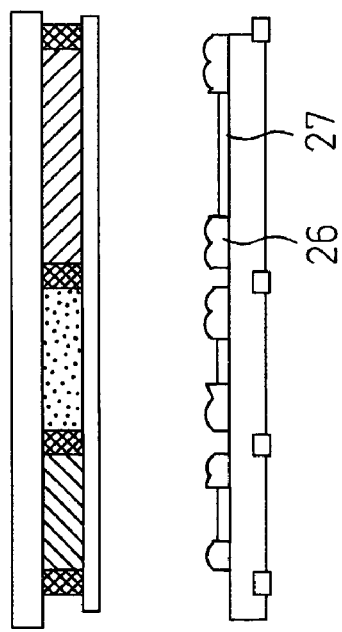

The panel structures in FIG. 16C and FIG. 16D differ from the panel structures in FIG. 16A and FIG. 16B in that a composite electrode made up of a reflective electrode part 26 and a transparent electrode 27 is provided instead of the reflective electrode 23. Due to this, a panel structure applicable to a liquid crystal display device of a semi-transmission type can be realized. In the case of application, it may be possible to change the reflective electrode domain ratio or make the opening ratio of the transmission domain variable, or adopt both. If the color purity of the backlight (BL) light source is designed with a low temperature (about D55), the change in whiteness degree in a state of transmission or in a state of reflection can be reduced considerably, therefore, a liquid crystal display device capable of giving almost the same display impression both in the state of transmission and in the state of reflection can be realized.

FIG. 17A to FIG. 17D are diagrams showing modification examples of the panel structure in the first embodiment. The panel structures in FIG. 17A and FIG. 17B differ from the panel structures in FIG. 16A and FIG. 16C in that each CF is formed adjacently and the BM is eliminated. The same effect can also be obtained from these structures.

Figure 17A:
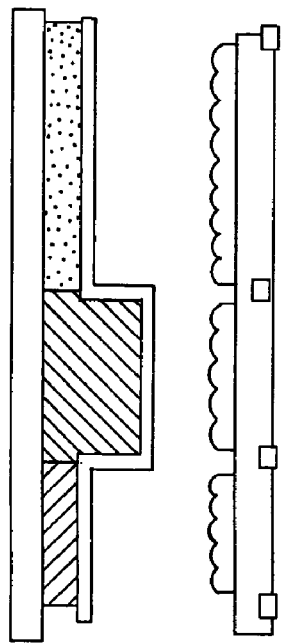
FIG. 17A to FIG. 17D are diagrams showing modification examples of the panel structure of the liquid crystal display device in the first embodiment.
Figure 17B:
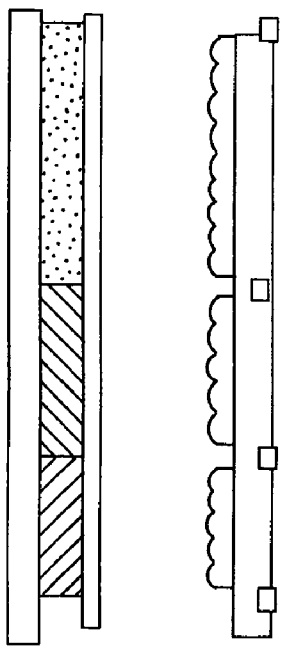
Figure 17C:
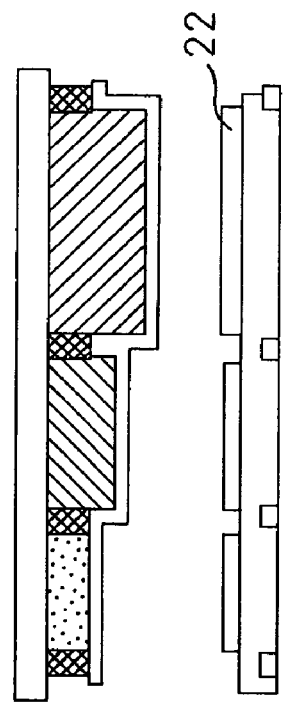
Figure 17D:
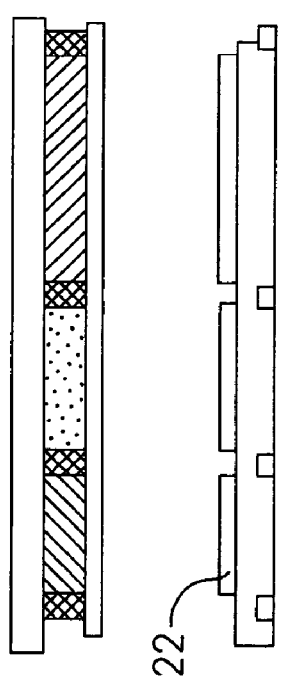

FIG. 17C and FIG. 17D show the panel structures applicable to a liquid crystal display device of a transmission type, which differ from the panel structures in FIG. 16A and FIG. 16C in that the transparent pixel electrode 22 is provided instead of the reflective pixel electrode. The present invention is applicable to the liquid crystal display device of a transmission type and the same effect can also be obtained from such panel structures.

Figure 1:
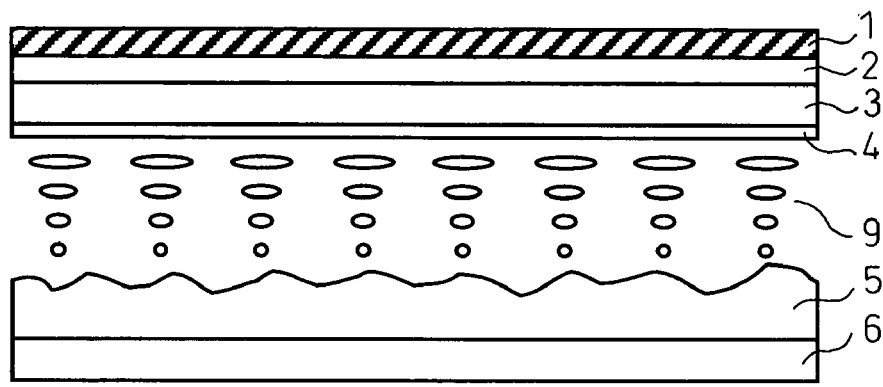
FIG. 1 is a diagram showing the panel structure of a liquid crystal display device of a reflection type using liquid crystal of a TN type.
Figure 2:
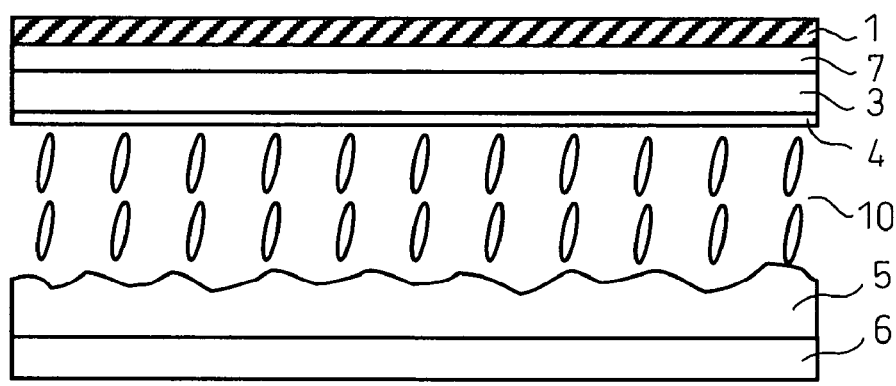
FIG. 2 is a diagram showing the panel structure of a liquid crystal display device of a reflection type using liquid crystal of a VA type.
Figure 3:
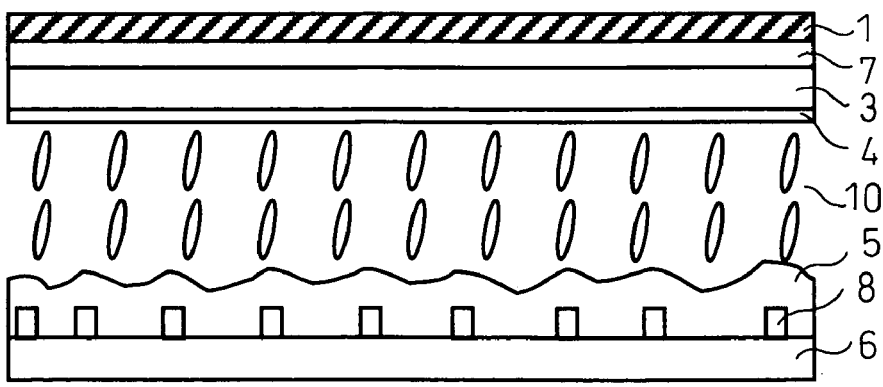
FIG. 3 is a diagram showing the panel structure of a liquid crystal display device of a reflection type using liquid crystal of a VA type and having a wrinkle-like diffuse reflective electrode.
Figure 18:
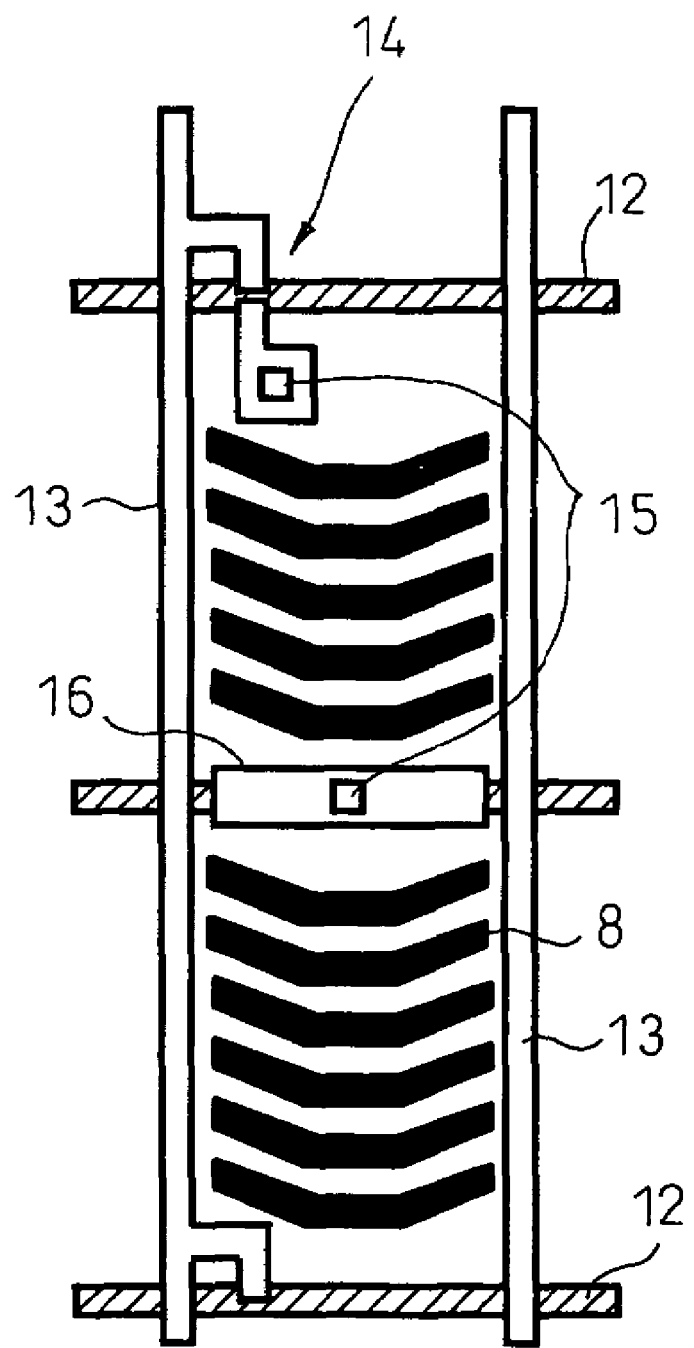
FIG. 18 is a diagram showing the shape of a pixel structure of a liquid crystal display device in a second embodiment of the present invention.

FIG. 18 is a diagram showing the shape of a pixel structure in the second embodiment of the present invention. The liquid crystal display device in the second embodiment is the liquid crystal display device of a reflection type explained in FIG. 3 and FIG. 4, in which the reflective electrode 5 is a wrinkle-like diffuse reflective electrode having unevenness in accordance with the shape of the unevenness of the structure 8. As shown in FIG. 18, the structure 8 in the second embodiment is made up of multiple protrusions extending in the direction of the short side of the rectangular pixel electrode as in the conventional structure shown in FIG. 4, and both ends of each protrusion are bent toward the same side. Hereinafter, such a protrusion is referred to as a bent protrusion.

The type liquid crystal display device of a reflection type in the second embodiment is manufactured in the following process. The structure made up of the bent protrusions shown in FIG. 18 is formed on a TFT substrate in the same layer as that of a gate electrode line and positive-type photo resist is applied on the TFT substrate with a thickness of 3 μm. Then, after being pre-baked in an oven for 20 minutes at a temperature of 90° C., it is post-baked in the oven for 40 minutes at a temperature of 135° C. After post-baking, it is irradiated with ultraviolet rays at a rate of 2,600 mJ/cm$^2$, and after irradiation with UV rays, it is baked for 60 minutes at a temperature of 215° C. In this manner, the wrinkle-like unevenness in accordance with the shape of the structure 8 is formed. The reflective electrode is formed by vaporizing aluminum thereon with a thickness of 200 nm. The TFT substrate having this reflective electrode (other parts are manufactured as before) and the CF substrate with the transparent electrode (ITO) having a thickness of 0.7 mm (other parts are manufactured as before) are bonded together via a spacer, n-type liquid crystal ($\Delta n$=0.1) is inserted in between, a polarizing plate G1220DU is adhered on the CF substrate and, thus, a liquid crystal display device of a reflection type is manufactured.

Figure 4:
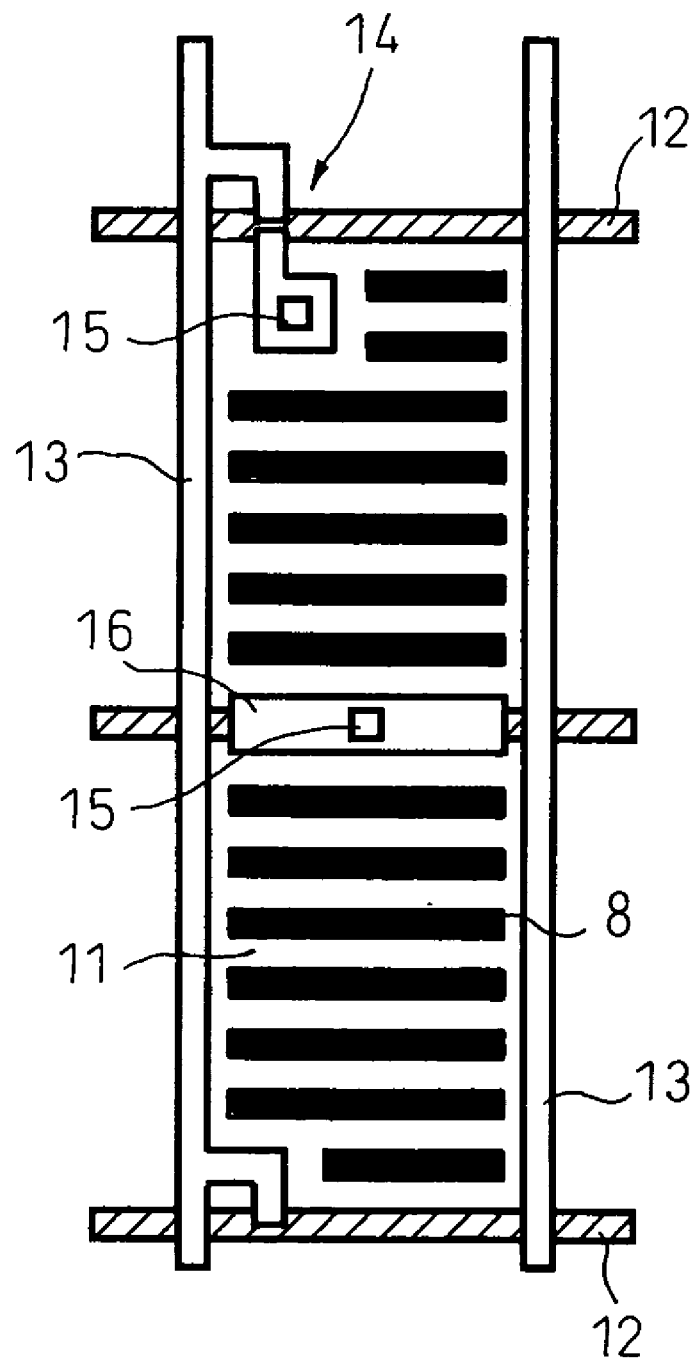
FIG. 4 is a diagram showing a conventional shape example of a structure for realizing unevenness of the wrinkle-like diffuse reflective electrode shown in FIG. 3.
Figure 7A:
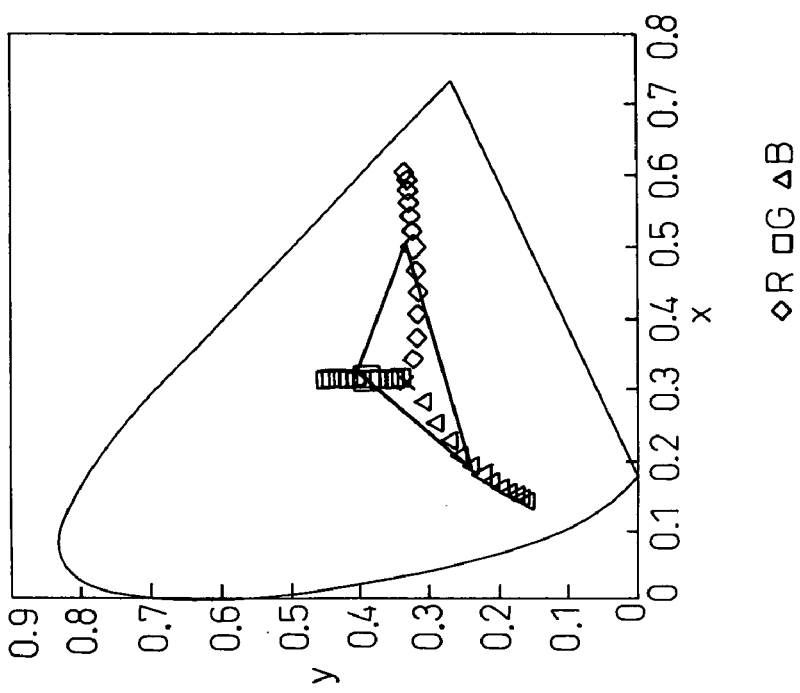
FIG. 7A and FIG. 7B are diagrams showing the chromaticity dependency of color filters (CF).
Figure 7B:
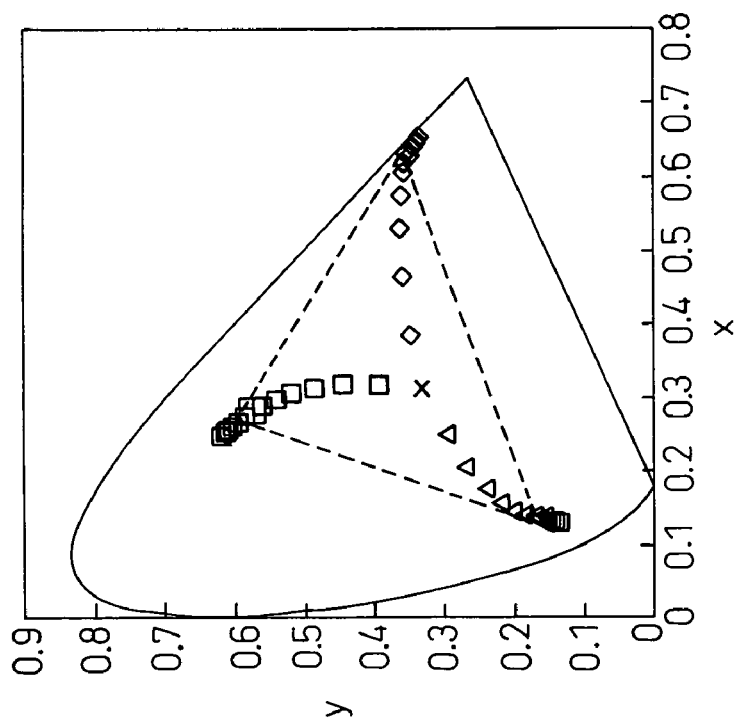
Figure 8:
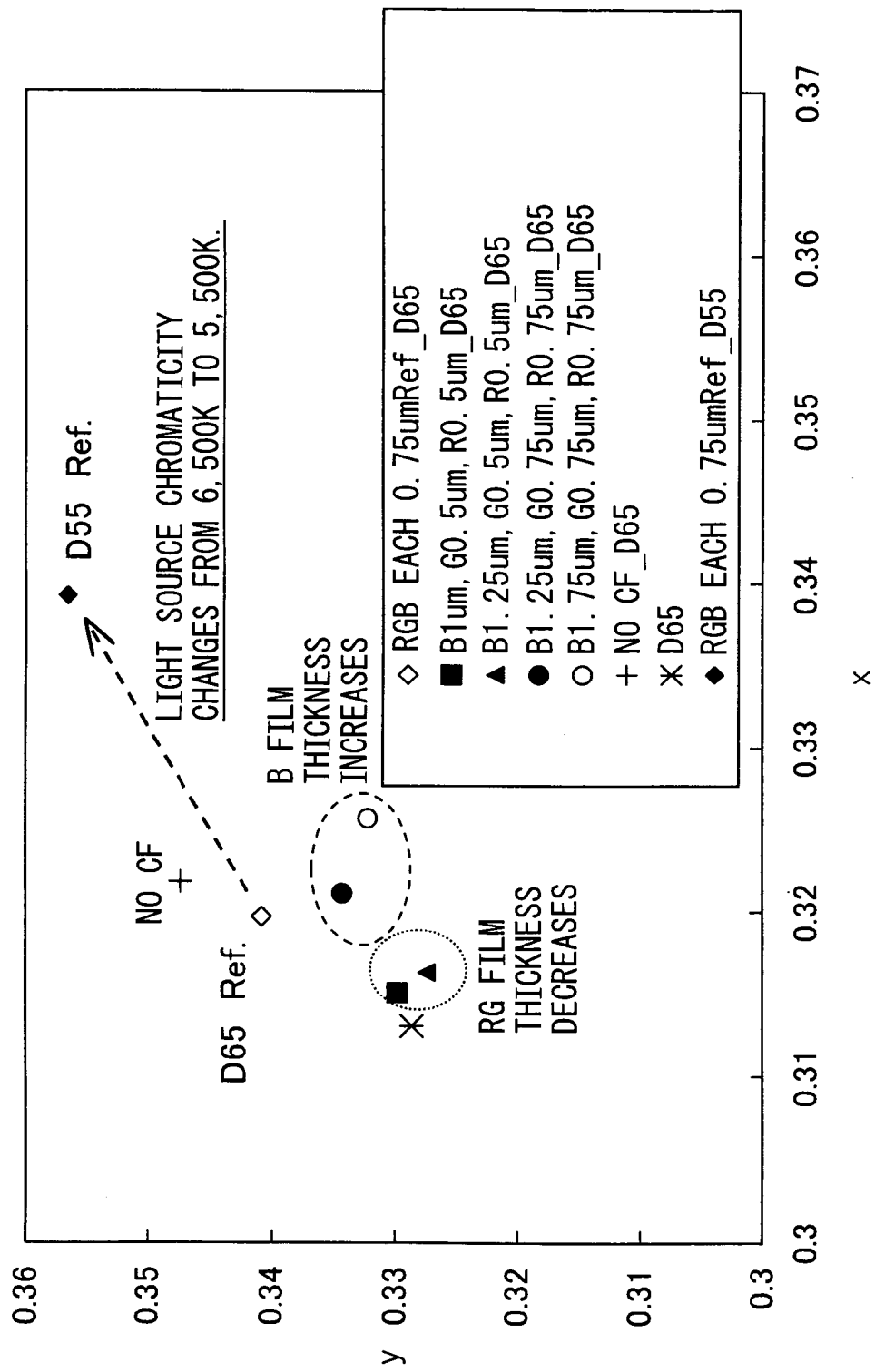
FIG. 8 is a diagram showing the change in whiteness degree.
Figure 9:
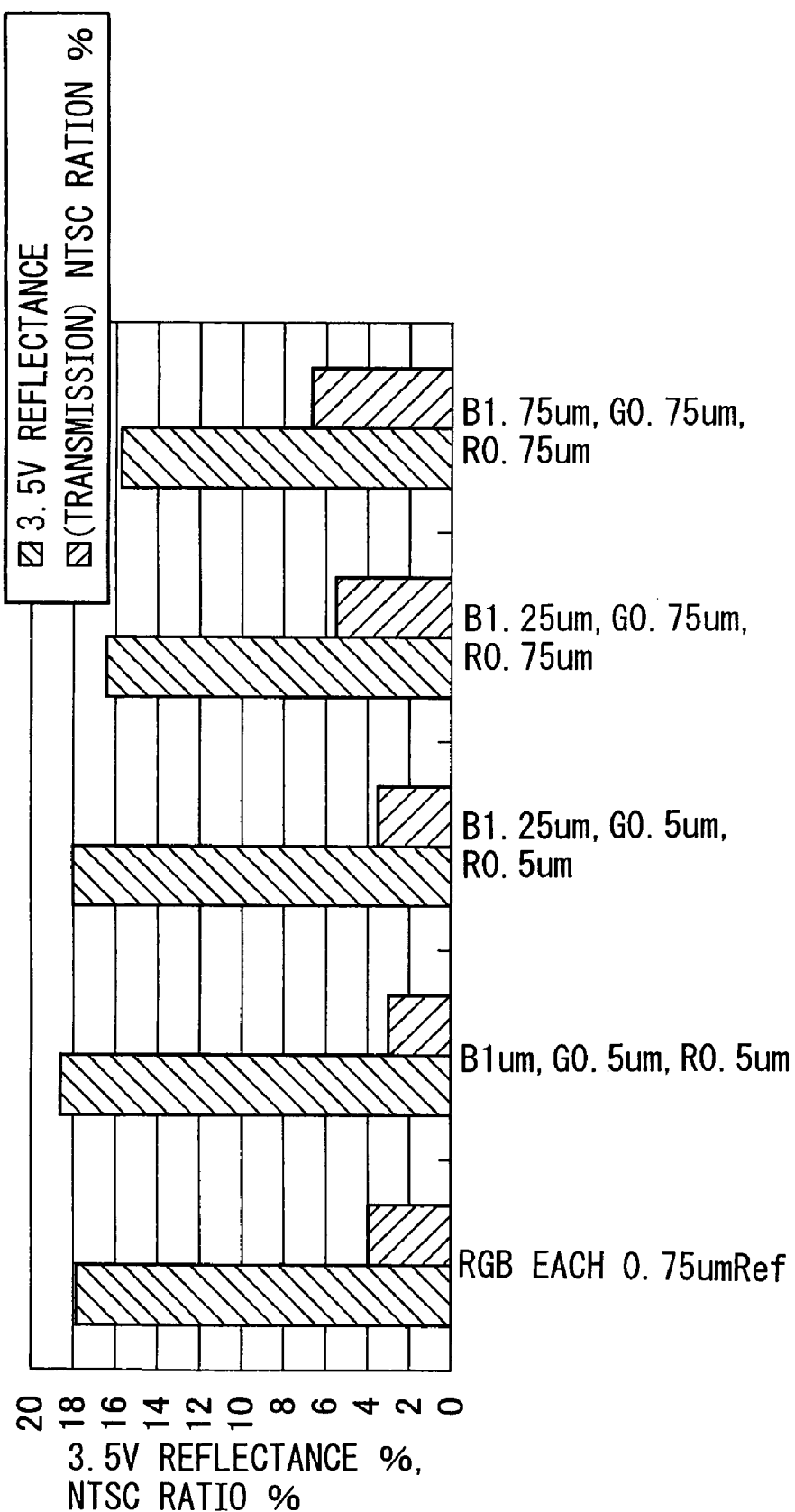
FIG. 9 is a diagram showing the color reproduction area and reflectance.
Figure 11A:
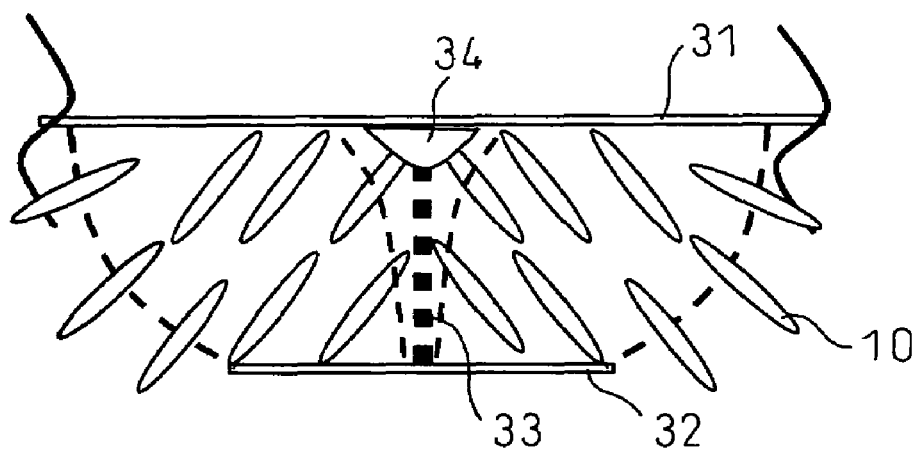
FIG. 11A and FIG. 11B are diagrams for explaining the control of the disinclination.
Figure 11B:
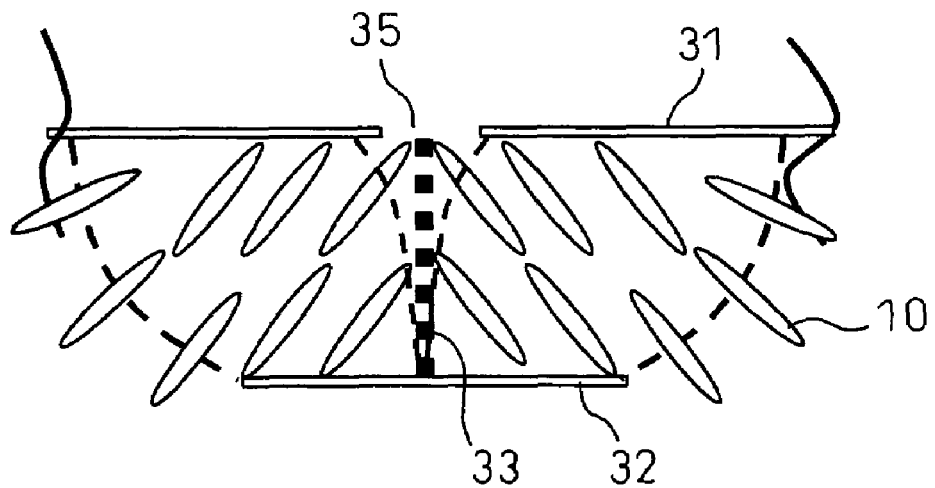
Figure 12A:
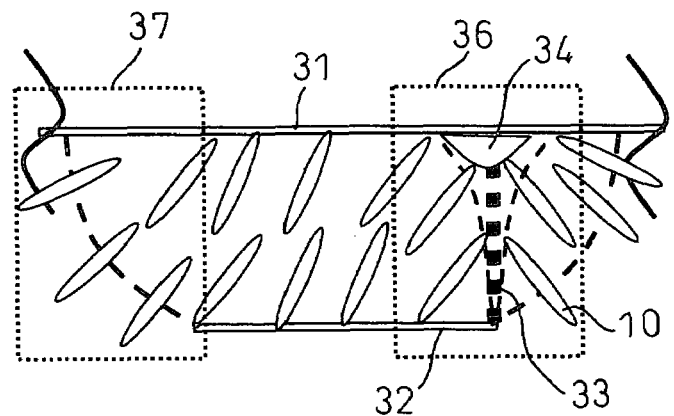
FIG. 12A to FIG. 12C are diagrams for explaining the control of the disinclination.
Figure 12B:
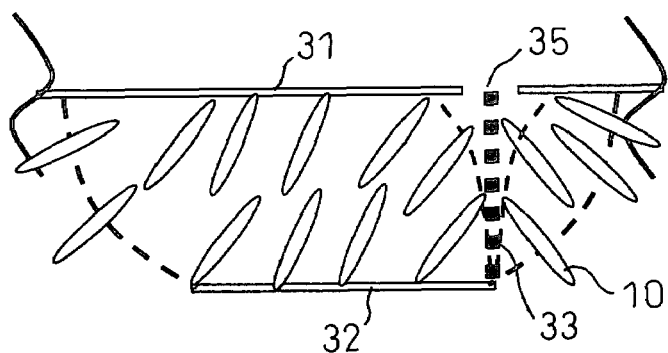
Figure 12C:
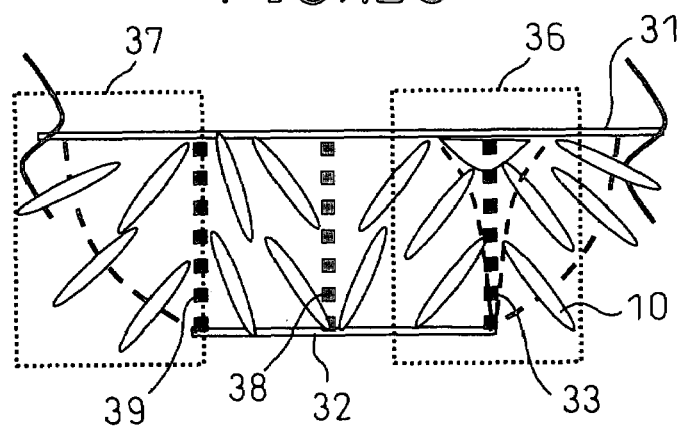
Figure 13:
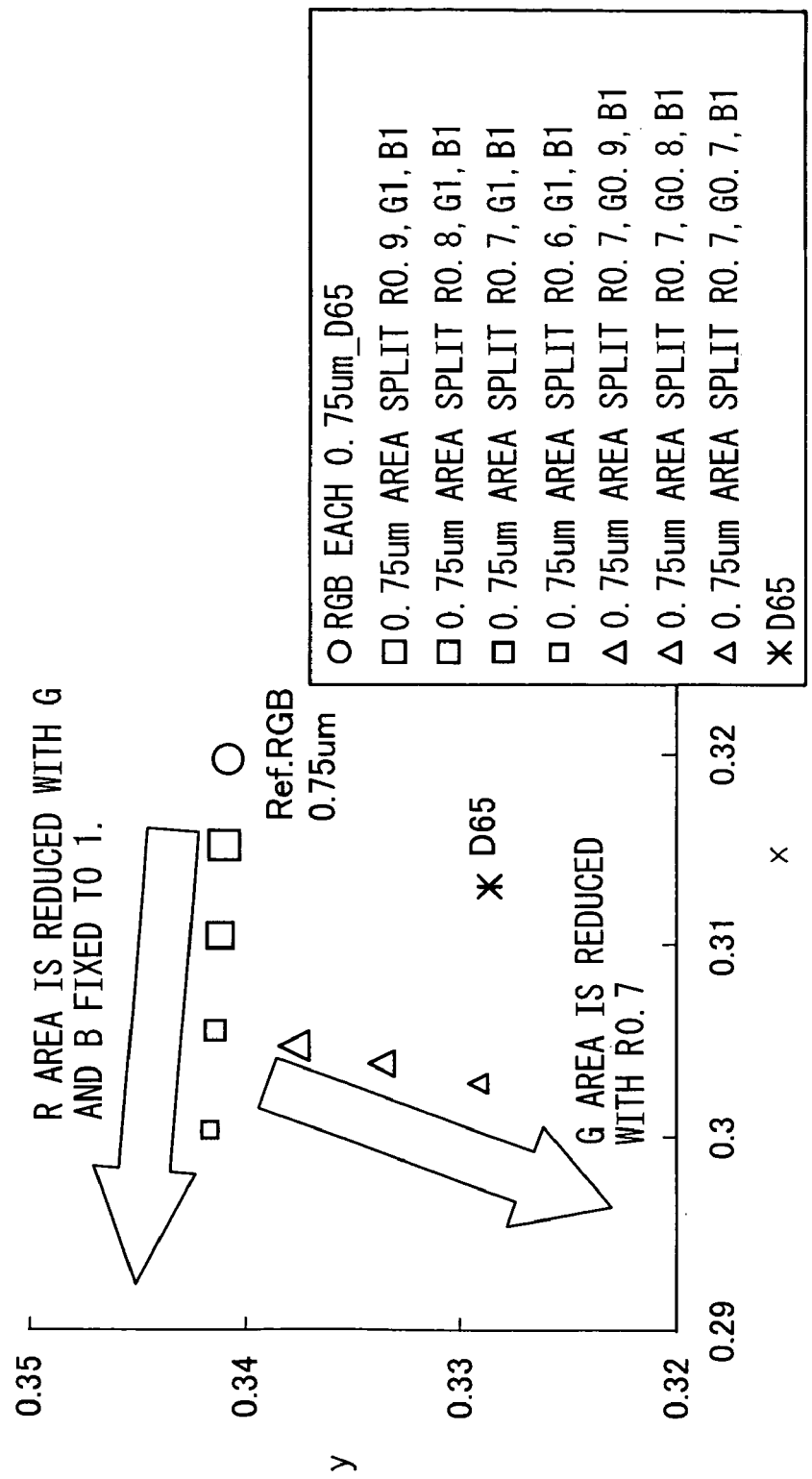
FIG. 13 is a diagram showing the change in chromaticity depending on the sub-pixel area of a reflective CF.
Figure 14:
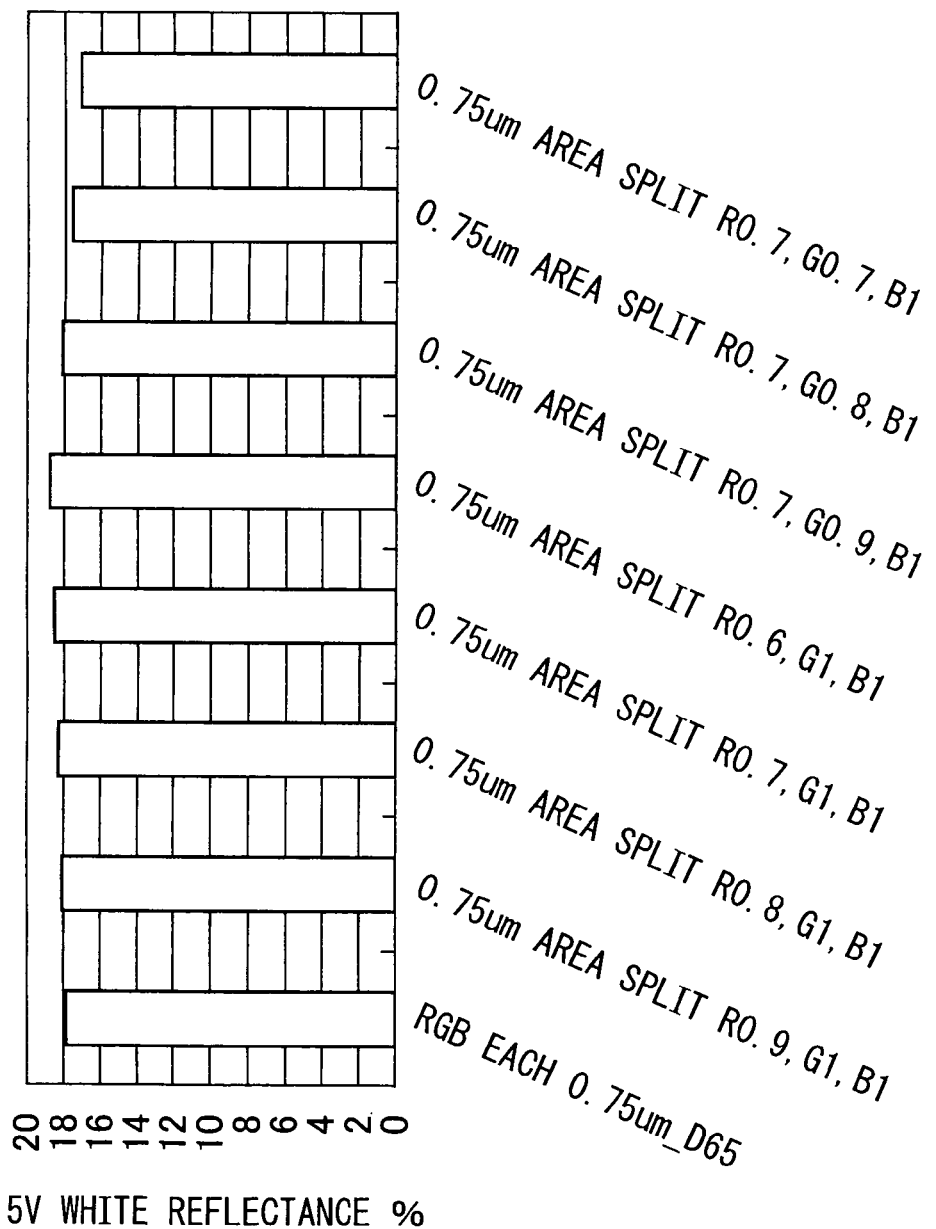
FIG. 14 is a diagram showing the reflectance when the sub-pixel area ratio is changed.

The liquid crystal display device of a reflection type manufactured in the above-mentioned manner and the conventional liquid crystal display device of a reflection type provided with the linear structure as shown in FIG. 4 on the TFT substrate were compared by visual observation. The result was that the liquid crystal display device of a reflection type in the second embodiment was found to realize a brighter display. In this observation, it is easily possible to observe a bright state with no voltage being applied because the ¼ wavelength plate is not provided between the polarizing plate and the glass substrate.

If these reasons for improvement are considered, it will be found that there exist multiple light sources in a normal environment and rays of light enter the liquid crystal display device from various directions, therefore, the linear structure can use only the light source in the direction perpendicular thereto. In contrast to this, in the case of the bent structure in the second embodiment, the range of angles is widened and, therefore, the efficiency in use of rays of incident light is increased. Therefore, it is possible to obtain a brighter display by the wrinkle-like unevenness of the bent structure than by that of the linear structure.

Figure 19A:
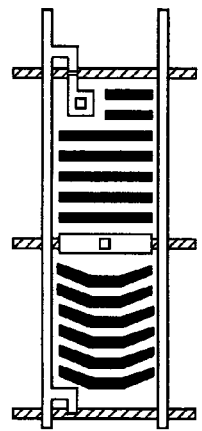
FIG. 19A to FIG. 19G are diagrams showing modification examples of the shape of the pixel structure in the second embodiment.
Figure 19B:
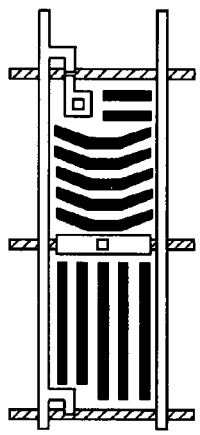
Figure 19C:
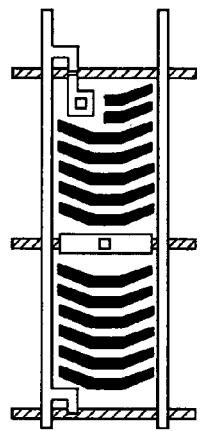
Figure 19D:
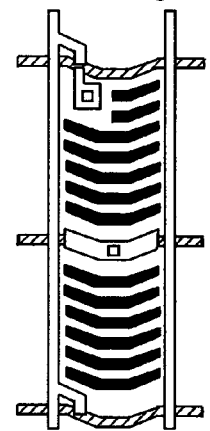
Figure 19E:
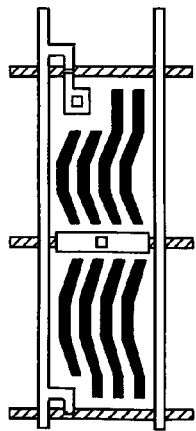
Figure 19F:
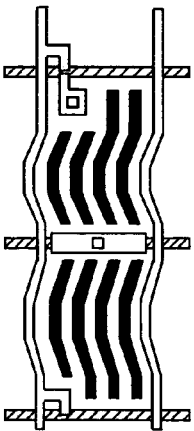
Figure 19G:
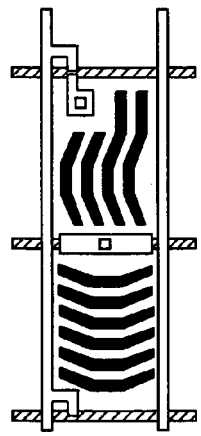

FIG. 19A to FIG. 19G are diagrams showing modification examples in the second embodiment. FIG. 19A shows a structure, in which the same linear protrusions as before are provided on the upper side of the rectangular pixel electrode and the lower part has the same bent structure as that in the second embodiment. FIG. 19B shows a structure, in which, conversely to that in FIG. 19A, the upper part has the bent structure and the lower part has the structure of the linear protrusions. FIG. 19C shows a structure, which is the same as the bent structure in the second embodiment shown in FIG. 18, except in that the bent structures are also provided in the narrow part on the upper side. FIG. 19D shows a structure, which is the same as the structure in FIG. 19C, except in that the gate electrode lines are also bent. FIG. 19E shows a structure, in which the protrusions are made to have a shape extending along the long side of the rectangular pixel electrode and therefore, the structure is a bent structure. FIG. 19F shows a structure, which is the same structure as that in FIG. 19E, except in that the source electrode lines are also bent. FIG. 19G shows a structure, in which the direction in which the protrusions extend is made to differ by 90° between the upper side and the lower side of the rectangular pixel electrode.

It is possible to enhance the performance of control of the wrinkle-like unevenness by also bending the gate electrode lines and the source electrode lines as shown in FIG. 19D and FIG. 19F. At this time, it is also possible to change the normal rectangular shape of the pixel electrode into one in accordance with the bending pattern.

FIG. 19A to FIG. 19G show only part of modification pattern examples and there can be various modification examples. For example, in a case where the pattern is different between the upper side and the lower side, it may be possible to switch the patterns between the upper side and the lower side or to combine other patterns. It is also possible to design random bent structures by combining patterns the bending direction of which are opposite to each other.

It is possible to effectively use the light from the transverse or vertical direction by arranging the bent structures in the transverse or vertical direction accordingly. Particularly in an actual environment such as an office using a display device of a reflection type, a bright display can be obtained.

Figure 20A:
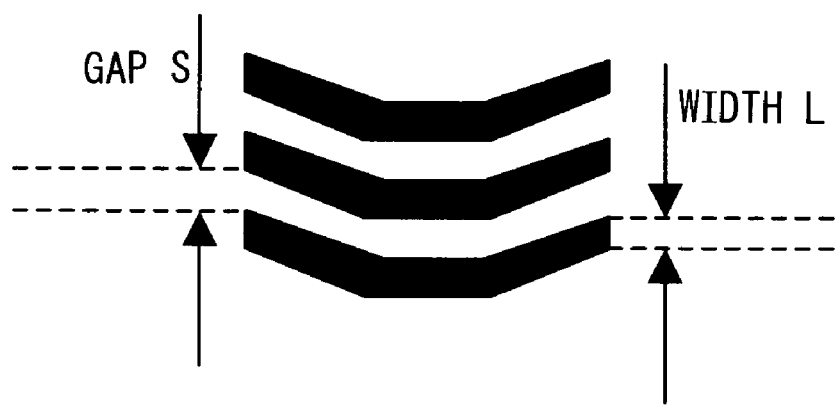
FIG. 20A and FIG. 20B are diagrams for explaining the definition of a bent shape of the pixel structure in the second embodiment.
Figure 20B:

FIG. 20A and FIG. 20B are diagrams for explaining the definition of the bent shape, and FIG. 20A shows the definition of the width of and the gap between the protrusions making up the structure and FIG. 20B shows the definition of the angle of bending. When the width L of and the gap S between the protrusions are defined as shown in FIG. 20A, the control performance of the wrinkle-like unevenness to be formed varies depending on L and S and, therefore, it is desirable that L and S are adjusted to proper values. In particular, it is necessary to set L to a value equal to or less than 10 μm, and S to a value equal to or less than 15 μm, in order to form wrinkle-like unevenness in accordance with the structure. If this range is exceeded, a domain which does not fit to the structure appears in the wrinkle-like unevenness and the reflectance is degraded because of the degraded control performance of the reflected light.

When the angle of bending θ of the bent structure is defined as shown in FIG. 20B, it is preferable that θ is equal to or less than 45° and, particularly preferable, between 20 to 30°. By selecting these angles, the proper width of directivity can be realized and a high reflectance can also be realized. In the figure, the angle of bending is the same between the right side and the left side, but this is not necessarily required but it may be possible to make differ from each other depending on the purposes of the display device of a reflection type.

Figure 21A:
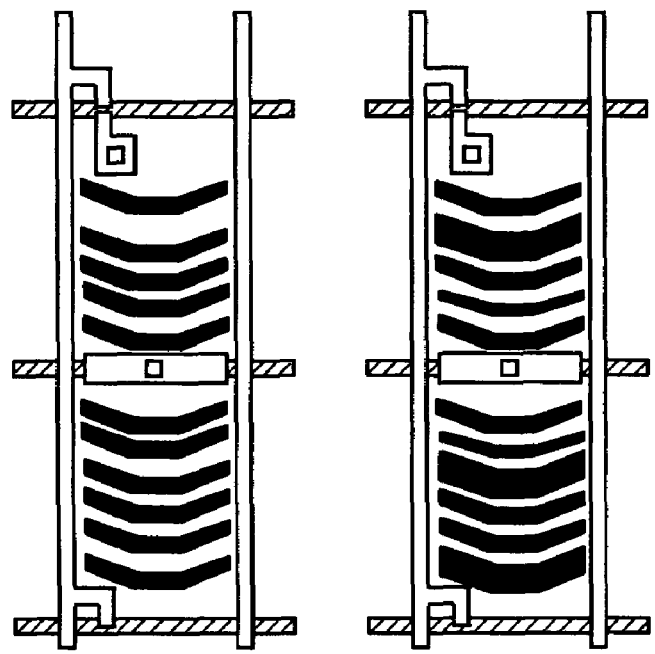
FIG. 21A and FIG. 21B are diagrams showing modification examples of the shape of the pixel structure in the second embodiment.
Figure 21B:
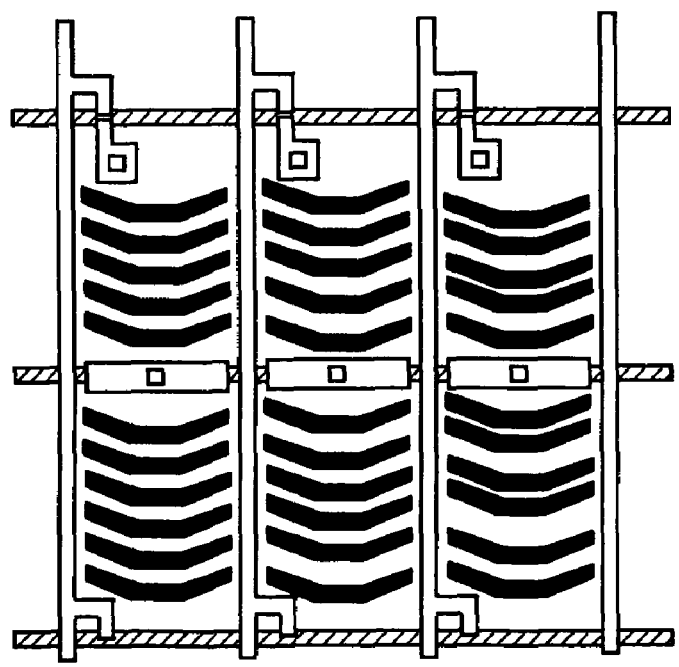

When the width L and the gap S are maintained to be fixed, there may be a case where coloring due to interference is caused in the reflected light because the wrinkle-like unevenness having the same shape is likely to be formed. To prevent this, it is effective to randomly change the width L or the gap S in the pixel as shown in FIG. 21A or to change the width L and the gap S for each pixel as shown in FIG. 21B. However, in this case also, the width L and the gap L need to satisfy the above-mentioned range (L is equal to or less than 10 μm, S is equal to or less than 15 μm).

By setting the average tilting angle of the wrinkle-like unevenness to 5 to 15°, light is not enclosed in a liquid crystal display device of a reflection type, therefore, a high reflectance can be obtained.

Figure 22:
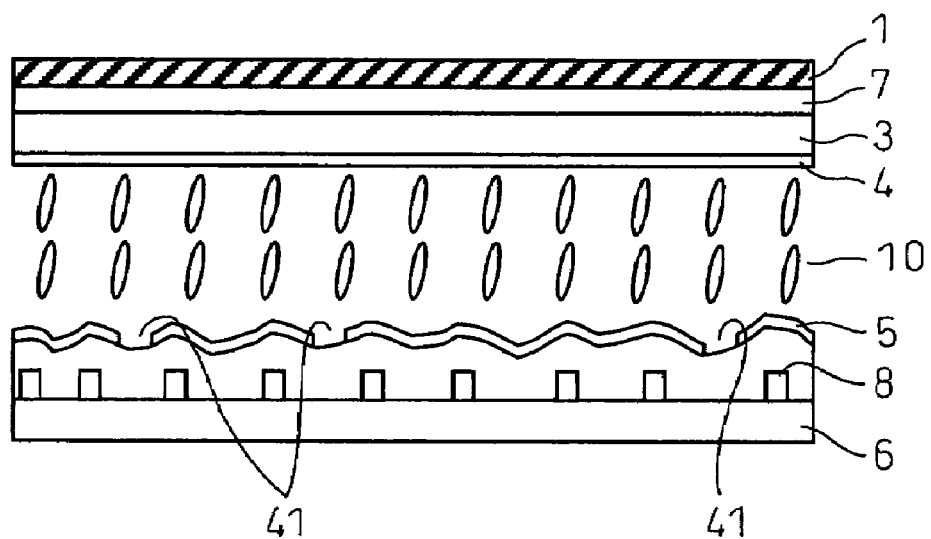
FIG. 22 is a diagram showing a modification example of the pixel structure in the second embodiment.

Moreover, a liquid crystal display device of a transmission type can be realized by providing holes 41 for light transmission in the reflective electrode as shown in FIG. 22. In this case also, the same effect as that of the second embodiment can be obtained, as to reflection.

Figure 23:
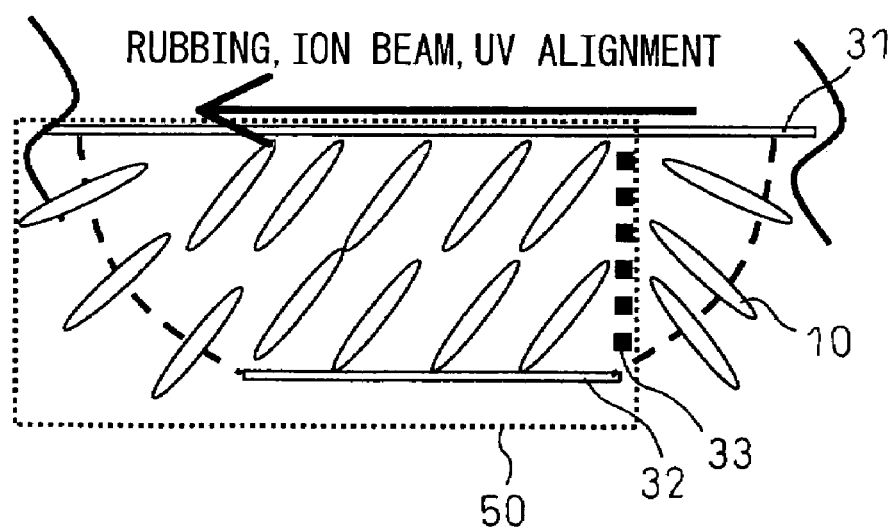
FIG. 23 is a diagram showing the panel structure of a liquid crystal display device in a third embodiment of the present invention.

FIG. 23 is a diagram for explaining the panel structure of the liquid crystal device in the third embodiment of the present invention. In the liquid crystal display device in the third embodiment, in order to enhance the property of withstanding vibrations, the force for alignment control is increased over the entire surface within the display area by carrying out any one of the rubbing process, UV alignment process, ion beam alignment process and UV curable resin alignment process, or a combination thereof on the aligned film surface (here, only the aligned film on one of the electrodes (opposed electrode). The axis of transmission of the polarizing plate is in the direction of rubbing, that is, the direction in which the short side of the rectangular pixel electrode extends.

Figure 24A:
FIG. 24A and FIG. 24B are diagrams showing the disinclination in the liquid crystal display device in the third embodiment.
Figure 24B:
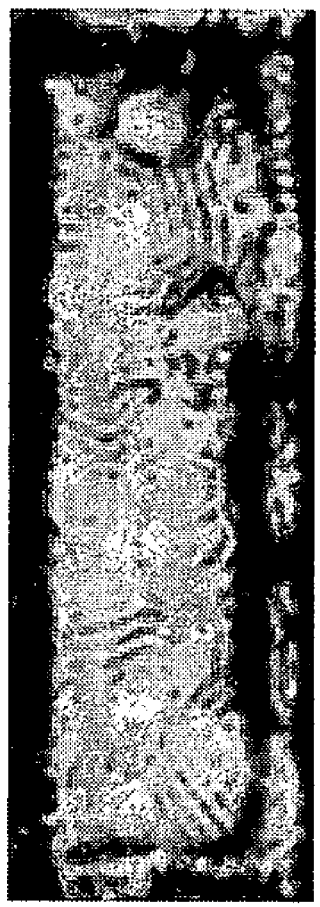

FIG. 24A and FIG. 24B are diagrams showing the occurrence of the disinclination in the vertically aligned liquid crystal display device in which the rubbing process was carried out in the extending direction of the short side of the rectangular pixel electrode only on the vertically aligned film on the opposed electrode 31 of the opposed (CF) substrate, and FIG. 24A shows a case where black and white are switched while strong vibrations are being applied and FIG. 24B shows a case of a normal black and white display with no vibration. In this case, a more excellent property of withstanding vibration was observed, compared to the conventional case, but not a sufficiently satisfactory one. The cause of this was inspected and it was found that the state in which the disinclination was formed might be different between a case where black and white were switched while strong vibrations were being applied and a case of a normal black and white display in the domain where liquid crystal met and in this case, an afterimage was recognized.

Figure 26A:
FIG. 26A to FIG. 26D are diagrams showing the influence of the alignment direction in the liquid crystal display device in the third embodiment.
Figure 26B:
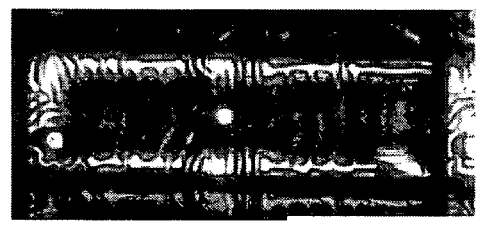
Figure 26C:
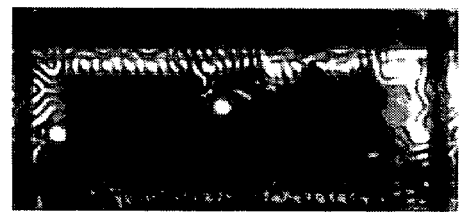
Figure 26D:
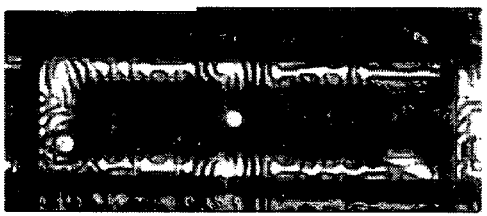

Because of this, by means of the technique disclosed in 2002-221716, a reflective electrode was formed by sputtering its surface, on which unevenness had been formed, with aluminum (Al), vertically aligned films were formed on a glass substrate on which a transparent opposed electrode had been formed, and after the rubbing process was carried out only on the opposed substrate, both were bonded together via 3 μm spacers to form a vacant cell and finally a panel was manufactured on trial by injecting n-type nematic liquid crystal. At the same time, a panel on which the rubbing process was carried out in the direction in which the short side of the rectangular pixel electrode extended as shown in FIG. 25A, and another panel on which the rubbing process was carried out in the direction in which the long side extended as shown in FIG. 25B were manufactured and analyzed. The result was that the disinclination as shown in FIG. 26A to FIG. 26D occurred. FIG. 26A shows the case of a normal black and white display without vibrations on a panel on which the rubbing process is carried out in the direction in which the short side extends, FIG. 26B shows the case of a normal black and white display without vibrations on a panel on which the rubbing process is carried out in the direction in which the long side extends, FIG. 26C shows the case where black and white are switched while strong vibrations are being applied on a panel on which the rubbing process is carried out in the direction in which the short side extends, and FIG. 26D shows the case where black and white are switched with strong vibrations being applied on a panel on which the rubbing process is carried out in the direction in which the long side extends.

It was found that the domain in which the disinclination was unstable was a domain located on the periphery of the pixel and in which the liquid crystal orientation was different from the tilting orientation of the liquid crystal due to the transverse electric field of the outer edge of the pixel and it is less than 90°. As a result it was found that the liquid crystal within the pixel needed to be aligned in order to minimize the domain for the improvement in the property of withstanding vibrations, and a liquid crystal display panel more excellent in the property of withstanding vibrations could be realized by keeping the domain in which the disinclination was unstable near the short side of the pixel as shown in FIG. 25B. Therefore, in a liquid crystal display device of a reflection type, if the alignment process is carried out in the direction in which the pixel extends when the pixel has a strip-like shape, it is possible to realize a liquid crystal display of high quality, excellent in the property of withstanding vibrations, and having a high contrast ratio and high reflection (transmission) characteristics.

Figure 27A:
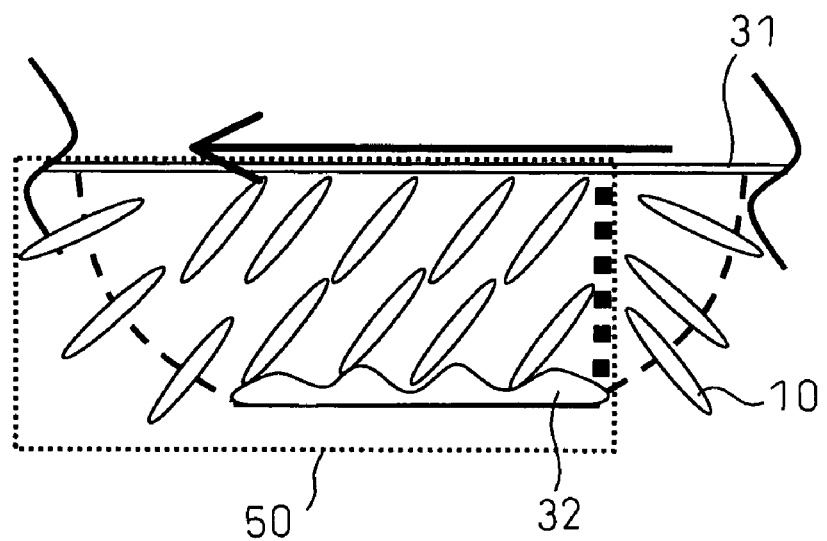
FIG. 27A and FIG. 27B are diagrams showing modification examples of the panel structure of the liquid crystal display device in the third embodiment.
Figure 27B:
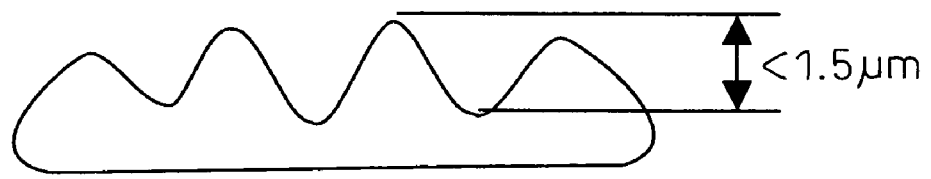

Moreover, after further consideration, it was found that a still more excellent property of withstanding vibrations could be observed when the difference in level of the reflective electrode 32 was equal to or less than 1.5 mµ as shown in FIG. 27A and FIG. 27B.

Figure 28A:
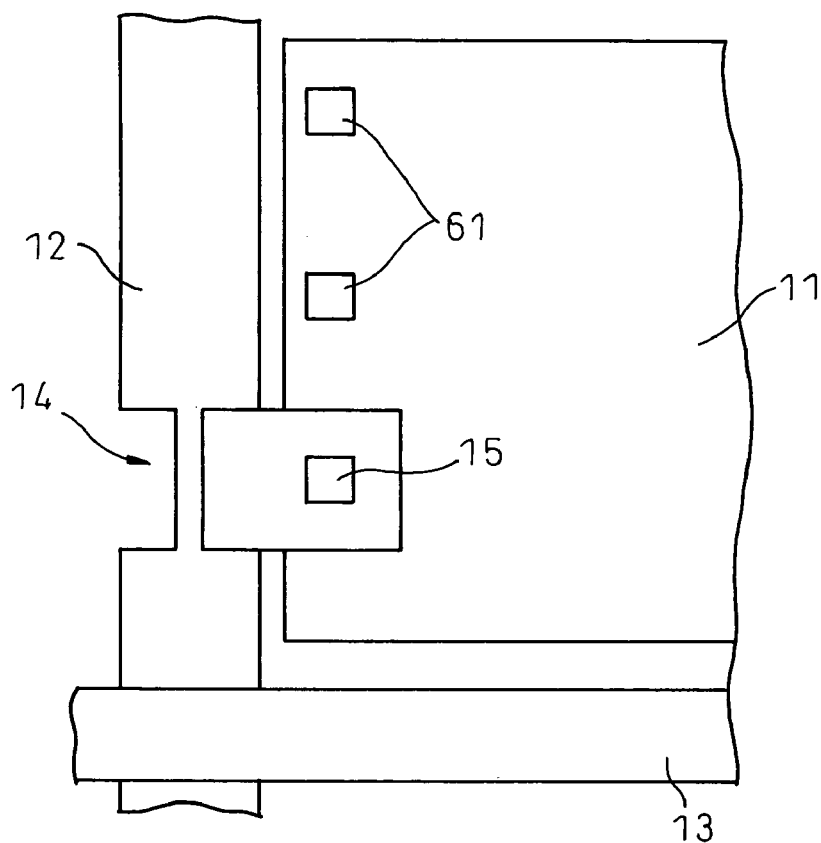
FIG. 28 A and FIG. 28B are diagrams showing modification examples of the liquid crystal display device in the third embodiment.
Figure 28B:
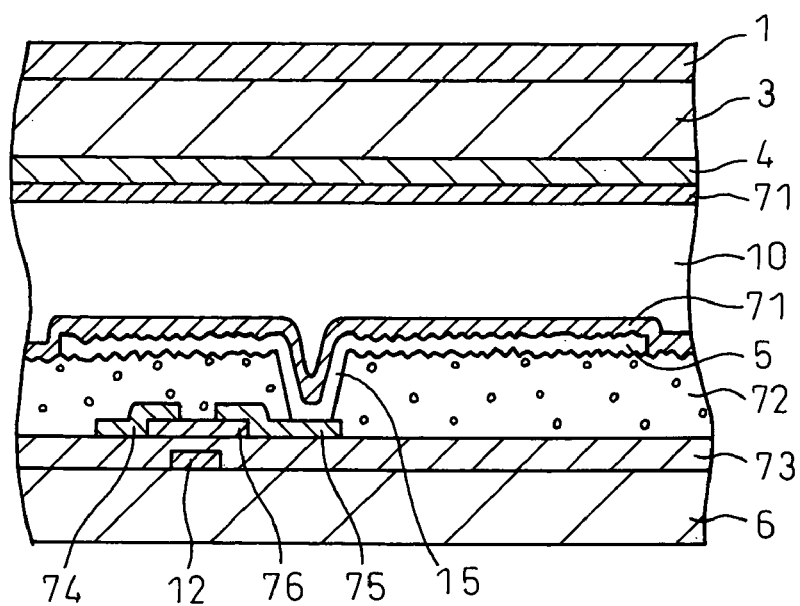

In the above-mentioned consideration of the property of withstanding vibrations, it was further found that if a dip, such as a control hole, in the pixel electrode was provided for increasing the cell thickness (thickness of the liquid crystal layer) in the domain in which the disinclination was unstable, the disinclination occurred stably and did not change. Therefore, as shown in FIG. 28, it is possible to fix the disinclination line to the short side of the pixel by keeping the domain in which the disinclination is unstable near the short side of the pixel and providing the contact hole 15 or a dip 61, or both to the part, as shown in FIG. 28A. FIG. 28B is a sectional view including the contact hole 15. Vertically aligned films 71 are formed on the opposed electrode 4 and the reflective pixel electrode 5, and a resin layer 72 and an insulation layer 73 are formed beneath the reflective pixel electrode 5. The TFT 14 is made up of a semiconductor layer 76, a source 74 connected to the source electrode line 13, the drain 15 and the gate electrode 12. The contact hole 15 is provided in the resin layer 72 on the drain 15 and the reflective pixel electrode 5 is connected thereto. The part of the contact hole 15 forms a dip. This dip fixes the disinclination. The dip 61 is formed in the process for forming the contact hole 15 and has the same shape except in that the lower part is not connected to the drain.

In the third embodiment, the alignment process was carried by the rubbing process, but when the same panel as that in the third embodiment was used, except in that the alignment process was carried out by the UV alignment in which the liquid crystal was aligned by irradiating the surface of the aligned film with UV light, the same result as that in the third embodiment was obtained.

Moreover, when n-type nematic liquid crystal mixed with UV curable resin monomer (stearyl, lauryl acrylate, UV curable liquid crystalline monomer, etc.) was injected after the substrates were bonded together, and the alignment process was carried out by the irradiation with polarized UV or oblique UV, the same result as that in the third embodiment was obtained.

Still moreover, when the configuration in the third embodiment was applied to a reflection-transmission type or a transmission type, a liquid crystal display device excellent in the property of withstanding vibrations could also be obtained.

The configuration in the third embodiment is not limited to the vertical alignment but can be applied to the horizontal alignment (TN, homogeneous) and the hybrid alignment (HAN), and the stability of the alignment is enhanced. Either way, it is important to minimize the influence of the transverse electric field of the outer surface of the pixel.

Figure 29:
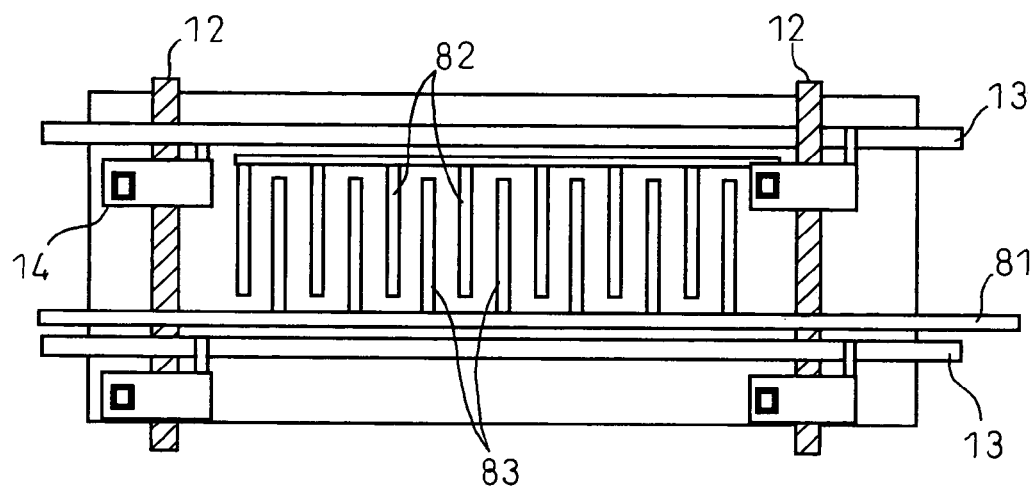
FIG. 29 is a diagram showing the pixel shape of a liquid crystal display device in a fourth embodiment of the present invention.

FIG. 29 is a diagram showing the shape of the pixel in the fourth embodiment of the present invention. The liquid crystal display device of a reflection type in the fourth embodiment is a device of an in-plane switching (IPS) type, and electrodes 82 and 83 of an IPS type on the surface of which unevenness has been formed are formed as shown in FIG. 29 by the use of the technique disclosed in Japanese Unexamined Patent Publication (Kokai) No. 2002-221716. The electrodes 82 are connected to the source electrode line 13 via the TFT 14 and the electrodes 83 are connected to a common line 81. The vertically aligned films were formed on this substrate and the transparent opposed glass substrate, and after the rubbing process was carried out in the direction of the long side of the pixel, both were bonded together via a 3 mµ spacer for forming a vacant cell, p-type nematic liquid crystal was injected, and thus a panel was manufactured on trial. This panel also was excellent in the property of withstanding vibrations and had a high contrast and a high reflectance.

I claim:

1. A liquid crystal display device comprising:
   a transparent electrode;
   a TFT substrate;
   a reflecting plate having wrinkle-like unevenness on the surface thereof; the wrinkle-like unevenness having a plurality of protrusions; and
   a liquid crystal layer provided between the transparent electrode and the reflecting plate,
   wherein at least part of the wrinkle-like unevenness has a first linear part extending in a first direction, a second linear part extending from the top end of the first linear part in a second direction different from the first direction by certain angles to a predetermined side, and a third linear part extending from the top end of the second linear part in a third direction different from the second direction by certain angles to the predetermined side,
   the wrinkle-like unevenness having a directional pattern,
   the wrinkle-like unevenness extending primarily in either horizontal or vertical direction on the display plane of the liquid crystal display device,
   further comprising a structure provided beneath the reflecting plate and having unevenness, wherein the wrinkle-like unevenness of the reflecting plate is almost in accordance with the unevenness of the structure,
   wherein the structure is formed in the same layer as at least any one of the signal wire, gate wire and storage capacitor of the TFT substrate, or part of the structure is formed in the same layer as at least one of the signal wire and the gate wire of the TFT substrate.

2. A liquid crystal display device, as set forth in claim 1, wherein the distance between neighboring crests or troughs of the wrinkle-like unevenness is equal to or less than 15 µm.

3. A liquid crystal display device, as set forth in claim 1, wherein the distance between neighboring crests or troughs of the wrinkle-like unevenness differs randomly.

4. A liquid crystal display device, as set forth in claim 1, wherein the distance between neighboring crests or troughs of the wrinkle-like unevenness differs from each another for each pixel.

5. A liquid crystal display device, as set forth in claim 1, wherein the difference between the first direction and the second direction and the difference between the second direction and the third direction are equal to or less than 45°.

6. A liquid crystal display device, as set forth in claim 1, wherein the average tilting angle of the wrinkle-like unevenness is 5° to 15°.

7. A liquid crystal display device, as set forth in claim 1, wherein said at least any one of the signal wire, gate wire and storage capacitor is bent in a similar fashion as the structure.

8. A liquid crystal display device, as set forth in claim 7, wherein the side of a pixel electrode is bent in a similar fashion as the structure.

9. A liquid crystal display device, as set forth in claim 1, wherein the reflecting plate has a light transmission domain and a display of a transmission type and a display of a reflection type are possible.

10. A liquid crystal display device, as set forth in claim 1, wherein the liquid crystal layer is of a vertically aligned type using n-type liquid crystal.

11. A liquid crystal display device comprising:
- a transparent electrode;
- a TFT substrate;
- a reflecting plate having wrinkle-like unevenness on the surface thereof, the wrinkle-like unevenness having a plurality of protrusions; and
- a liquid crystal layer provided between the transparent electrode and the reflecting plate, wherein:
- said plurality of the protrusions are arranged in parallel with each other when viewed from a direction perpendicular to the reflecting plate; and
- each of the protrusions has a first linear part extending in a first direction, a second linear part extending from the top end of the first linear part in a second direction different from the first direction by certain angles to a predetermined side, and a third linear part extending from the top end of the second linear part in a third direction different from the second direction by certain angles to the predetermined side, further comprising a structure provided beneath the reflecting plate and having unevenness, wherein the wrinkle-like unevenness of the reflecting plate is almost in accordance with the unevenness of the structure, wherein the structure is formed in the same layer as at least any one of the signal wire, gate wire and storage capacitor of the TFT substrate, or part of the structure is formed in the same layer as at least one of the signal wire and the gate wire of the TFT substrate.

12. The liquid crystal display device as set forth in claim 11, wherein the second direction in which the second linear part extends is a vertical direction of a display surface of the liquid crystal display device or a horizontal direction of the display surface of the liquid crystal display device.

13. The liquid crystal display device as set forth in claim 1, wherein said plurality of the protrusions are arranged so as not to cross each other.

* * * * *